(12) United States Patent
Narimatsu et al.

(10) Patent No.: US 12,479,027 B2
(45) Date of Patent: Nov. 25, 2025

(54) FORMING APPARATUS AND METHOD OF PRODUCING FORMED BODY

(71) Applicant: LG Chem, Ltd., Seoul (KR)

(72) Inventors: Eiichiro Narimatsu, Tokyo (JP); Yoshihiro Kinoshita, Tokyo (JP)

(73) Assignee: LG Chem, Ltd., Seoul (KR)

( * ) Notice: Subject to any disclaimer, the term of this patent is extended or adjusted under 35 U.S.C. 154(b) by 804 days.

(21) Appl. No.: 17/297,261

(22) PCT Filed: Dec. 24, 2019

(86) PCT No.: PCT/KR2019/018379
§ 371 (c)(1),
(2) Date: May 26, 2021

(87) PCT Pub. No.: WO2020/138905
PCT Pub. Date: Jul. 2, 2020

(65) Prior Publication Data
US 2021/0379660 A1    Dec. 9, 2021

(30) Foreign Application Priority Data

Dec. 25, 2018 (JP) ................................ 2018-240883

(51) Int. Cl.
*B22F 10/10* (2021.01)
*B22F 12/13* (2021.01)
(Continued)

(52) U.S. Cl.
CPC .............. *B22F 10/10* (2021.01); *B22F 12/13* (2021.01); *B22F 12/50* (2021.01); *B29C 64/295* (2017.08);
(Continued)

(58) Field of Classification Search
CPC .......... B22F 10/10; B22F 12/50; B22F 12/13; B22F 10/40; B22F 10/43; B33Y 10/00;
(Continued)

(56) References Cited

U.S. PATENT DOCUMENTS 6,531,191 B1 * 3/2003 Notenboom ............ B29C 67/04
427/559
10,144,152 B2    12/2018 Rothfuss
(Continued)

FOREIGN PATENT DOCUMENTS

CN    106256463 A    12/2016
CN    106794625 A    5/2017
(Continued)

OTHER PUBLICATIONS

JP2017136712A English language translation (Year: 2017).*
(Continued)

*Primary Examiner* — Galen H Hauth
*Assistant Examiner* — John Robitaille
(74) *Attorney, Agent, or Firm* — Lerner David LLP

(57) ABSTRACT

A forming apparatus capable of producing an inorganic material-containing formed body having improved quality, and a method of making the same is disclosed herein. In some embodiments, the forming apparatus includes a stage, a supply unit having a first supply unit and a second supply unit, where the first supply unit is configured to intermittently or continuously supply a first composition containing an inorganic material to a stage, where the second supply unit is configured to intermittently or continuously supply a second composition containing a support material configured to support the first composition to the stage, an immobilization unit configured to immobilize the second composition on the stage, a heating unit configured to apply heat to the first composition on the stage, and a control unit con-
(Continued)

figured to control the first supply unit and the heating unit to repeat supply and heating of the first composition.

7 Claims, 13 Drawing Sheets

(51) Int. Cl.
    *B22F 12/50*         (2021.01)
    *B29C 64/295*       (2017.01)
    *B29C 64/321*       (2017.01)
    *B33Y 10/00*        (2015.01)
    *B33Y 30/00*        (2015.01)

(52) U.S. Cl.
    CPC ............ *B29C 64/321* (2017.08); *B33Y 10/00* (2014.12); *B33Y 30/00* (2014.12)

(58) Field of Classification Search
    CPC ..... B33Y 30/00; B29C 64/321; B29C 64/295; B29C 64/14; B29C 64/40
    See application file for complete search history.

(56) References Cited

U.S. PATENT DOCUMENTS

| | | | |
|---|---|---|---|
| 2003/0149505 A1* | 8/2003 | Mogensen | H05K 3/1275 700/283 |
| 2012/0308837 A1* | 12/2012 | Schlechtriemen | C04B 35/119 264/610 |
| 2014/0231266 A1 | 8/2014 | Sherrer et al. | |
| 2016/0243619 A1 | 8/2016 | Gothait et al. | |
| 2016/0368053 A1 | 12/2016 | Kamakura | |
| 2017/0106444 A1 | 4/2017 | Ishida et al. | |
| 2017/0129012 A1 | 5/2017 | Ishida et al. | |
| 2017/0136693 A1 | 5/2017 | Okamoto et al. | |
| 2017/0225392 A1 | 8/2017 | Beak et al. | |
| 2017/0297111 A1* | 10/2017 | Myerberg | B29C 64/165 |
| 2018/0147627 A1 | 5/2018 | Nakamura et al. | |
| 2018/0192686 A1 | 7/2018 | Shoseyov et al. | |
| 2018/0250877 A1 | 9/2018 | Okamoto et al. | |
| 2018/0281062 A1 | 10/2018 | Cha et al. | |
| 2021/0354365 A1 | 11/2021 | Kritchman et al. | |

FOREIGN PATENT DOCUMENTS

| | | |
|---|---|---|
| CN | 206276911 U | 6/2017 |
| CN | 107030280 A | 8/2017 |
| JP | H11508326 A | 7/1999 |
| JP | 4800074 B2 | 10/2011 |
| JP | 2016196104 A | 11/2016 |
| JP | 2017504468 A | 2/2017 |
| JP | 2017087244 A | 5/2017 |
| JP | 2017088967 A | 5/2017 |
| JP | 2017136712 A | 8/2017 |
| JP | 2017177510 A | 10/2017 |
| JP | 2018090841 A | 6/2018 |
| JP | 2018144354 A | 9/2018 |
| JP | 2018149813 A | 9/2018 |
| KR | 20160018910 A | 2/2016 |
| KR | 101680334 B1 | 11/2016 |
| KR | 20170040060 A | 4/2017 |
| KR | 20180003953 A | 1/2018 |
| KR | 20180009832 A | 1/2018 |
| KR | 101912311 B1 | 10/2018 |
| KR | 20180114593 A | 10/2018 |
| KR | 20180134700 A | 12/2018 |
| WO | 2018087293 A2 | 5/2018 |

OTHER PUBLICATIONS

Search Report dated Jul. 8, 2022 from the Office Action for Chinese Application No. 201980077265.2 issued Jul. 19, 2022, pp. 1-3.
International Search Report for Application No. PCT/KR2019/018379, dated Apr. 3, 2020, 2 pages.

* cited by examiner

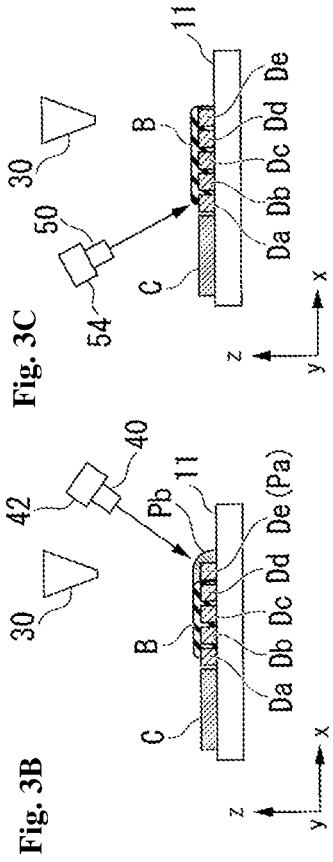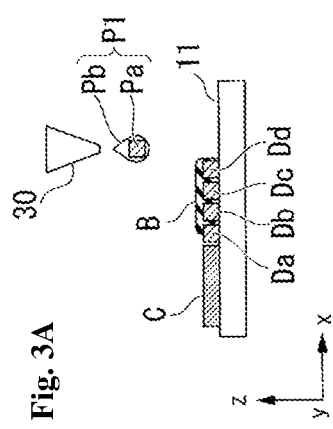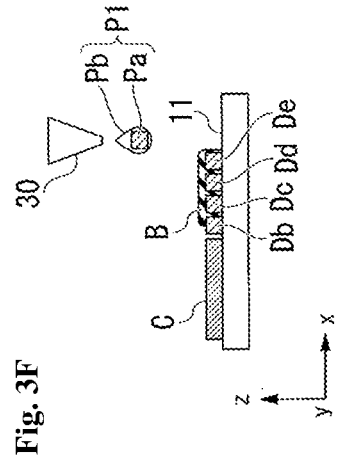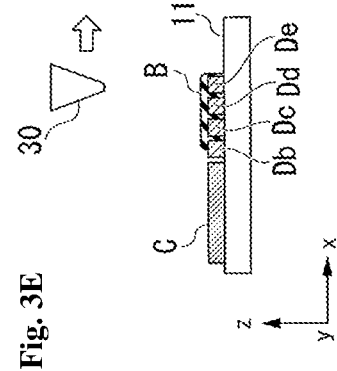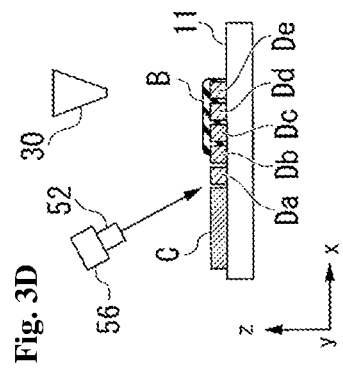
Fig. 3A Fig. 3B Fig. 3C Fig. 3D Fig. 3E Fig. 3F

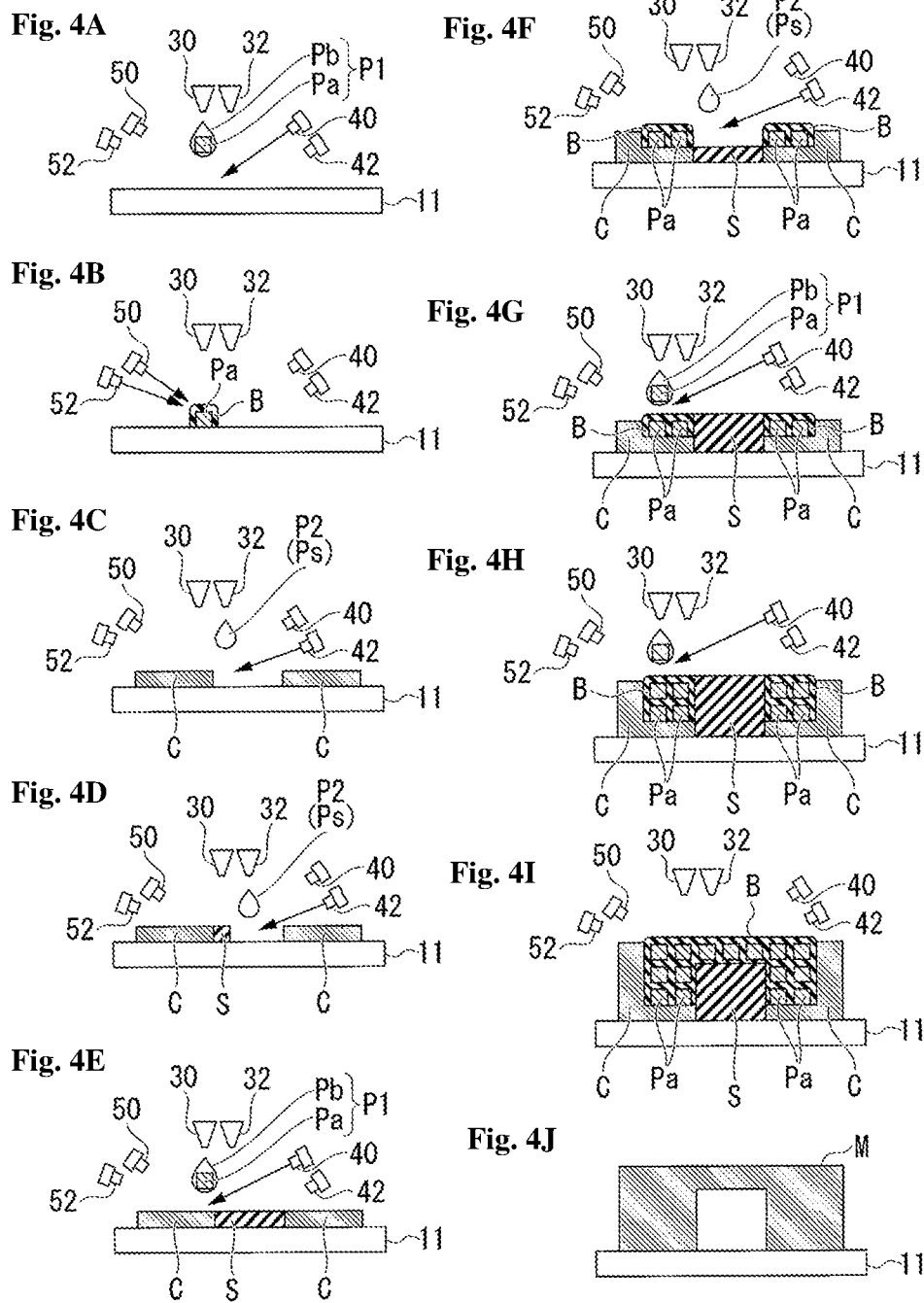

FORMING APPARATUS AND METHOD OF PRODUCING FORMED BODY

CROSS-REFERENCE TO RELATED APPLICATION(S)

The present application is a national phase entry under 35 U.S.C. § 371 of International Application No. PCT/KR2019/018379, filed on Dec. 24, 2019, which claims priority from Japanese Patent Application No. 2018-240883, filed on Dec. 25, 2018, the entire contents of which are incorporated by reference herein.

TECHNICAL FIELD

The present disclosure relates to a forming apparatus and a method of producing a formed body.

BACKGROUND ART

In recent years, three-dimensional prototyping techniques that use no mold have been developed to perform shaping of inorganic materials such as metals or metal oxides so as to have any three-dimensional shape.

Stereolithography, which is a typical three-dimensional prototyping technique for inorganic materials, is disclosed in Japanese Patent No. 4800074 (Patent Document 1) and the like. In stereolithography, a forming apparatus includes: a liquid tank for accommodating a liquid precursor in which inorganic particles are dispersed in a liquid photocurable composition; a stage provided liftably in the liquid tank; and a light source that irradiates light for curing the photocurable composition from the upper side of the liquid tank.

The stage is set at a position slightly below the liquid level of the liquid precursor, and a first layer is cured by irradiating light in a predetermined first layer pattern to the liquid precursor located on the stage. After curing the precursor of the first layer according to a predetermined pattern, the uncured liquid precursor of the first layer is washed out (washing process). Next, the stage is descended slightly, and a second layer immediately above the first layer is cured by irradiating light in a predetermined second layer pattern. As such an operation is repeated, and thus the precursor for each layer from the first layer to the uppermost layer is cured, thereby forming a formed body having a predetermined three-dimensional shape, which is composed of a plurality of layers.

The obtained formed body is composed of a cured photocurable composition and inorganic particles dispersed therein. Solvent extraction or heat treatment on this formed body is performed, and thus the photocurable composition is degreased and the organic material component in the formed body is removed (degreasing process). Further, after degreasing, the formed body composed of inorganic particles is baked at high temperature, so that the inorganic particles in the formed body are sintered (sintering process), thereby obtaining an inorganic material formed body having a predetermined three-dimensional shape.

However, in this stereolithography, when the three-dimensional shape becomes complex, the washing process becomes difficult to perform, the time required for the washing process also increases, and in some cases, sufficient washing can be impossible according to the shape, and as a result, deterioration in the quality of the formed body can occur. In the degreasing process, in particular, when the three-dimensional shape is complex, the organic material component or its decomposed component cannot be sufficiently removed and can remain in the formed body, and thus deterioration in the quality of the formed body can occur due to such insufficient removal. Further, since the organic material component is removed by degreasing, a gap corresponding to the volume of the removed organic material component is formed in the formed body, and the entire formed body can be compressed by the size of this gap by sintering, so that the dimensions of the finished formed body become smaller than the assumed dimensions. As a result, the dimensional accuracy of the formed body cannot satisfy the required quality. Further, in the sintering process, defects, such as cracks or damage, can occur in the formed body after sintering due to the difference in coefficient of thermal expansion between portions of the formed body, and thus the quality of the formed body cannot be ensured. For this reason, improvement in the quality of the formed body produced by a forming apparatus has been required.

PRIOR ART DOCUMENT

Patent Document (Patent Document 1): Japanese Patent No. 4800074

DISCLOSURE

Technical Problem

An object of the present disclosure is to provide a forming apparatus capable of producing an inorganic material-containing formed body having improved quality.

Technical Solution

One aspect of the present disclosure is a forming apparatus including a stage, a supply unit having a first supply unit configured to intermittently or continuously supply a first composition containing an inorganic material to the stage and a second supply unit configured to intermittently or continuously supply a second composition, containing a support material configured to support the first composition, to the stage, an immobilization unit configured to immobilize the second composition on the stage, a heating unit configured to apply heat to the first composition on the stage, and a control unit configured to control the first supply unit and the heating unit to repeat supply and heating of the first composition.

In the forming apparatus according to the aspect, the control unit can control the first supply unit and the heating unit to repeat supply and heating of the first composition at least along a surface of the stage.

In the forming apparatus according to the aspect, the control unit can control the first supply unit and the heating unit to repeatedly perform the supply and heating of the first composition at least within the same plane.

In the forming apparatus according to the aspect, the heating unit can include a thermal solidification heat source configured to at least thermally solidify the first composition, supplied from the first supply unit, on the stage. Further, the first composition can contain an organic binder having the inorganic material dispersed therein, the heating unit can further include a degreasing heat source configured to degrease the organic binder by applying heat to the first composition, and the control unit can control the degreasing heat source to perform the degreasing before the thermal solidification by the thermal solidification heat source.

In the forming apparatus according to the aspect, the immobilization unit can immobilize the first composition on the stage.

The forming apparatus according to the aspect can further include a removal unit configured to remove the second composition immobilized on the stage. Further, the support material can be decomposed at a temperature lower than the inorganic material when heated, and the removal unit can have a heating unit configured to decompose the support material by heating the support material. Alternatively, the removal unit can have a remover supplier configured to supply a remover, which dissolves or decomposes the support material but does not substantially dissolve and decompose the inorganic material.

In the forming apparatus according to the aspect, the inorganic material can be thermally solidified when heated up to a temperature of a first temperature or more by the heating unit, and the support material cannot be decomposed at the first temperature under the anaerobic atmosphere. The support material can be decomposed at the first temperature under the aerobic atmosphere.

In the forming apparatus according to the aspect, the second composition can be a photocurable composition, and the immobilization unit can include a light source, which photo-cures the second composition.

Another aspect of the present disclosure provides a method of producing a formed body from a first composition containing an inorganic material, the method including (a) supplying a first composition intermittently or continuously to a stage, wherein the first composition is supplied from a first supply unit, and wherein the first composition comprises an inorganic material, (b) supplying a second composition intermittently or continuously to the stage, wherein the second composition is supplied from a second supply unit, wherein the second composition containing a support material configured to support the first composition, (c) immobilizing the second composition on the stage, (d) heating the first composition on the stage, and (e) repeating steps (a) and (d) to form the formed body.

In the method of producing the formed body according to the aspect, step (e) occurs at least along the surface of the stage.

In the method of producing the formed body according to the aspect, the first supplying and the heating can be repeatedly executed at least within the same plane.

In the method of producing the formed body according to the aspect, step(d) comprises thermally solidifying the first composition, supplied from the first supply unit, on the stage. Further, in the method of producing the formed body according to the aspect, step (c) can further include curing the supplied first composition, before thermally solidifying the first composition. Further, the method of producing the formed body according to the aspect can further include degreasing the cured first composition, after curing the first composition and before heating the first composition.

The method of producing the formed body according to the aspect can further include removing the second composition immobilized on the stage. Further, the support material can be decomposed at a temperature lower than the inorganic material when heated, and the removing can include a process of decomposing the support material by heating the support material. Alternatively, the removing can include a process of dissolving or decomposing the support material by supplying a remover which dissolves or decomposes the support material but does not substantially dissolve and decompose the inorganic material. Alternatively, the heating can be executed under the anaerobic atmosphere (a state where oxygen in the atmosphere does not substantially affect the operation effects) so that the support material is not substantially decomposed, and the removing can include a process of decomposing the support material by exposing the support material to oxygen.

In the method of producing the formed body according to the aspect, the control unit can control the supply unit and the heating unit so that the formed body is formed in a three-dimensional shape by the inorganic material, based on three-dimensional shape data of the formed body, which has been previously input.

DESCRIPTION OF DRAWINGS

FIGS. 3A to 3F depict steps of a method of producing a formed body by the forming apparatus of the first embodiment.

FIGS. 4A to 4J depict steps of a method of producing a formed body by the forming apparatus of the first embodiment.

Figure 1:
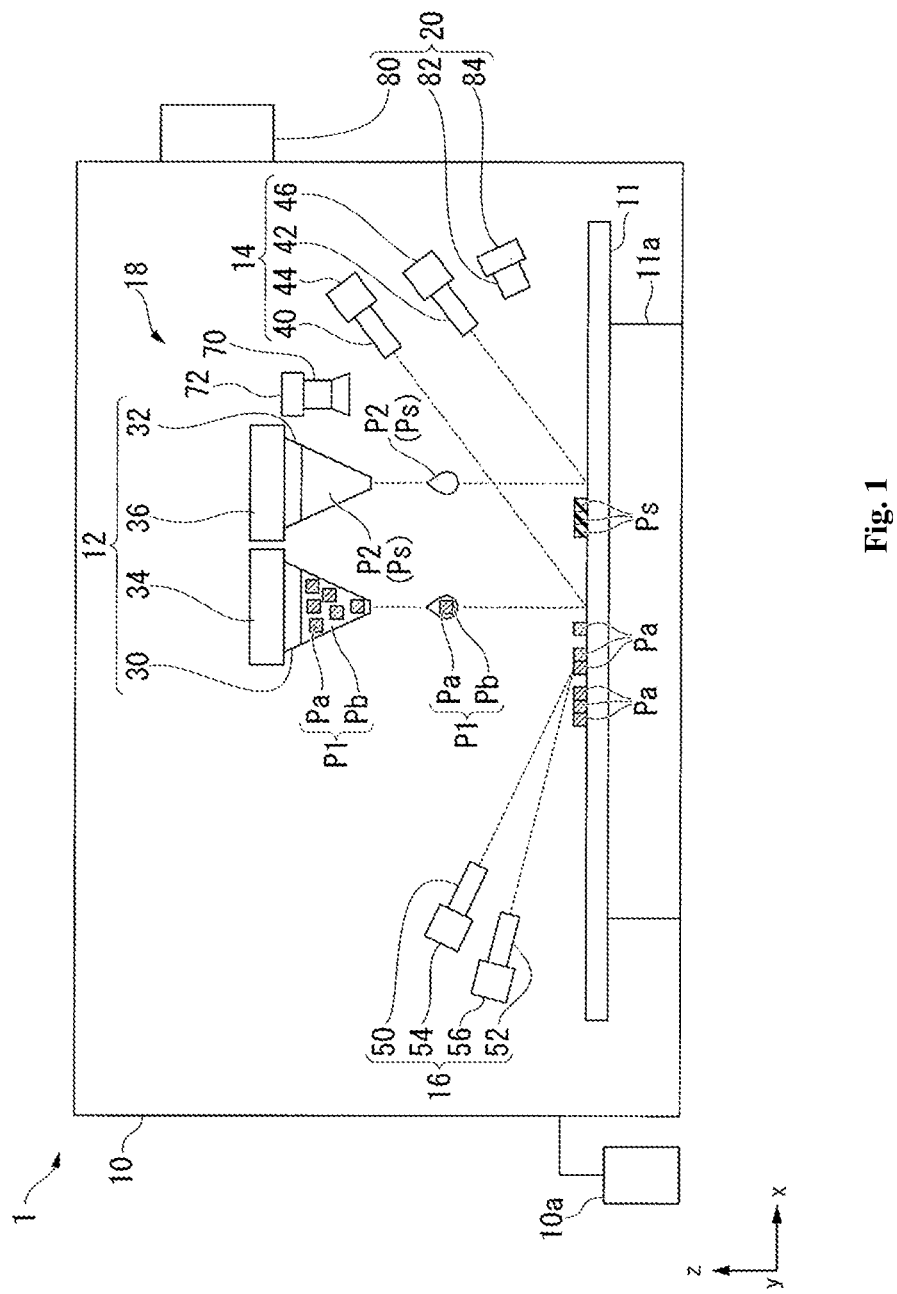
FIG. 1 is a schematic front diagram showing a forming apparatus according to a first embodiment.

DESCRIPTION OF REFERENCE NUMERALS 1, 101, 201: forming apparatus
10, 110, 210: chamber
10a, 110a, 210a: vacuum pump
11, 111, 211: stage
11a, 111a, 211a: stage moving mechanism
12, 112, 212: supply unit
14, 114, 214: immobilization unit
16, 116, 216: heating unit
18, 118, 218: information acquisition unit
20, 120, 220: removal unit
22, 122, 222: control unit
30, 130, 230: first dispenser (first supplier)
32, 132, 232: second dispenser (second supplier)
34, 134, 234: first dispenser moving mechanism 36, 136, 236: second dispenser moving mechanism
40, 140: first LED
42, 142: second LED
44, 144: first LED moving mechanism
46, 146: second LED moving mechanism
50, 250: degreasing laser (degreasing heat source)
52, 252: thermal solidification laser (thermal solidification heat source)
54, 254: degreasing laser moving mechanism
56, 256: thermal solidification laser moving mechanism
70, 170, 270: photographing device
72, 172, 272: photographing device moving mechanism
80, 280: heating device
82, 282: removal laser
84, 284: removal laser moving mechanism
90, 190, 290: input unit
150: first degreasing laser
152: first thermal solidification laser
154: second degreasing laser
156: second thermal solidification laser
158: first degreasing laser moving mechanism
160: first thermal solidification laser moving mechanism
162: second degreasing laser moving mechanism
164: second thermal solidification laser moving mechanism
180: remover supplier
182: remover supplier moving mechanism
210b: gas bombe
210c: flow rate control unit
240: LED
242: melting laser
244: LED moving mechanism
246: melting laser moving mechanism

BEST MODE

Hereinafter, a forming apparatus and a method for producing a formed body according to embodiments of the present disclosure will be described with reference to the accompanying drawings. Further, in the following description, like reference numerals refer to components having the same or similar function. The overlapping description of these components will be properly omitted.

In the present specification, the term 'based on XX' means 'based on at least XX', and includes a case based on other elements in addition to XX. Further, the term 'based on XX' is not limited to a case of using XX directly, and also includes the case based on calculation or processing having been performed with respect to XX. The term 'XX' is any element (for example, any information).

For convenience of explanation, the x-direction, the y-direction, and the z-direction will now be defined. The x-direction and the y-direction are directions parallel to the horizontal plane. The y-direction is a direction intersecting (for example, approximately orthogonal to) with the x-direction. The z-direction is a direction parallel to the vertical direction and is approximately orthogonal to the x-direction and the y-direction.

First Embodiment

A first embodiment will be described with reference to FIGS. 1 to 5. FIG. 1 is a diagram showing a forming apparatus 1 according to the first embodiment.

[Configuration]

The forming apparatus 1 can produce a three-dimensional formed body (formed body) made of an inorganic material.

Here, the term 'inorganic material' refers to any material other than an organic material, and includes compounds consisting of single metals, alloys, metal elements and nonmetal elements (for example, metal oxides, metal nitrides, metal salts, or the like), compounds consisting of nonmetal elements (for example, boron nitride or the like), and the like.

Figure 2:
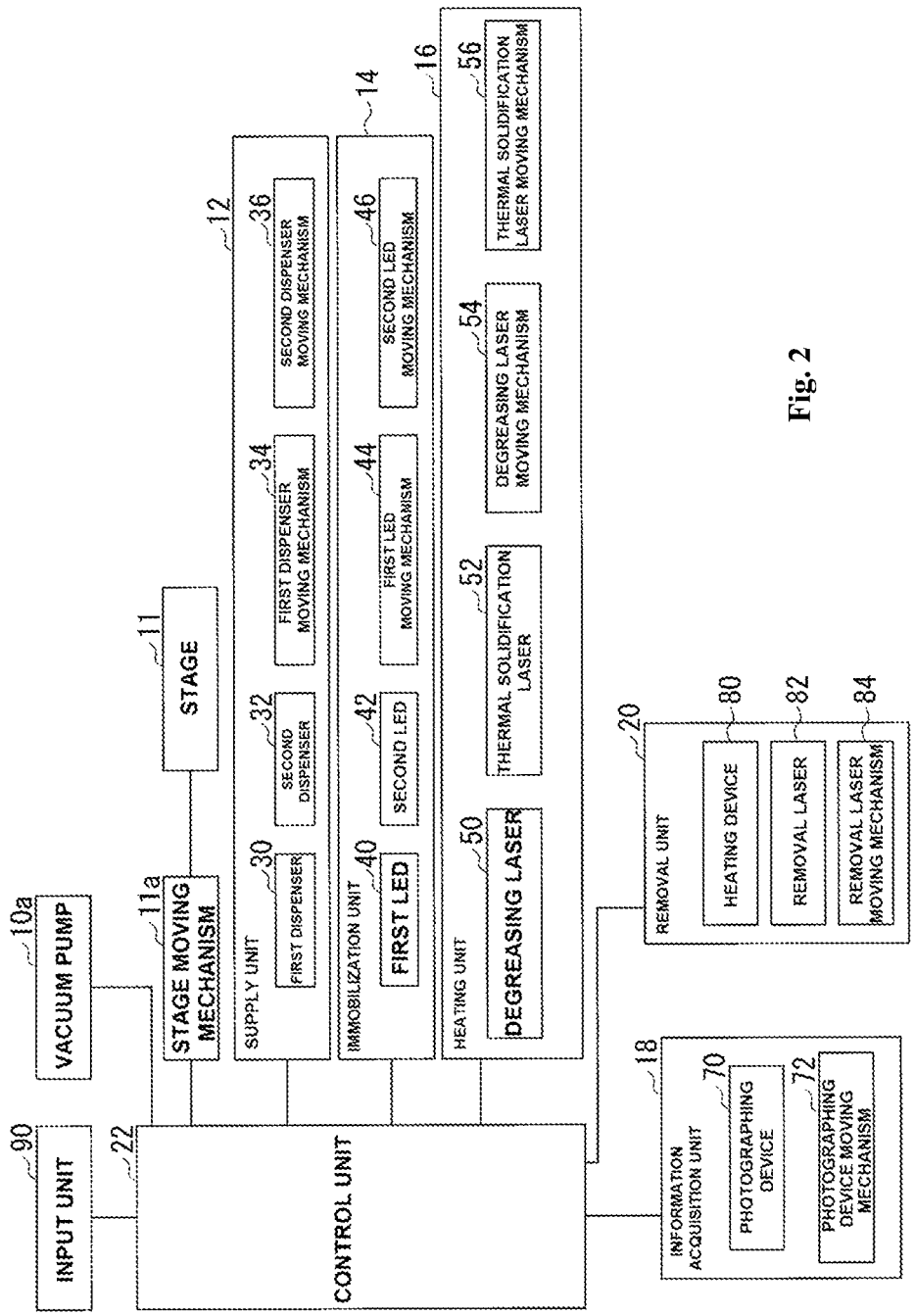
FIG. 2 is a block diagram showing an example of a system configuration of the forming apparatus of the first embodiment.

As shown in FIG. 1, the forming apparatus 1 includes a chamber 10, a stage 11, a supply unit 12, an immobilization unit 14, a heating unit 16, an information acquisition unit 18, a removal unit 20, and a control unit 22 (see FIG. 2).

The chamber 10 has a housing for accommodating each component of the forming apparatus 1. Each component of the forming apparatus 1 accommodated in the chamber 10 can be isolated from the external environment. The internal pressure of the chamber 10 can be changed by a vacuum pump 10a connected to the chamber 10. Further, the atmosphere inside the chamber 10 can be substituted with an inert gas such as nitrogen or argon or any other gas.

The stage 11 is a flat plate disposed along a horizontal plane (that is, to parallel to the xy-plane). The thickness direction of the stage 11 is approximately parallel to the z-direction. The stage 11 is movable at least in the z-direction by a stage moving mechanism 11a. The stage moving mechanism 11a is, for example, a rack-and-pinion type actuator driven by a motor (not shown). Further, the arrangement of the stage 11 is not necessarily limited to the above example. For example, the stage 11 can also be disposed along the plane intersecting the horizontal plane.

The supply unit 12 has a first dispenser (first supplier) 30 and a second dispenser (second supplier) 32 which are spaced apart from the stage 11 and disposed above the stage 11. The first dispenser 30 and the second dispenser 32 are movable at least in the x-direction and the y-direction by a first dispenser moving mechanism 34 and a second dispenser moving mechanism 36, respectively. The first dispenser moving mechanism 34 and the second dispenser moving mechanism 36 are, for example, articulated arms driven by a motor (not shown).

The first dispenser 30 is filled with a first composition (P1). The second dispenser 32 is filled with a second composition (P2). The first dispenser 30 and the second dispenser 32 can intermittently or continuously discharge the first composition (P1) and the second composition (P2) toward the stage 11. The discharge amounts (for example, the volume of one drop in a case where the first composition (P1) or the second composition (P2) is intermittently discharged) or discharge rates of the first dispenser 30 and the second dispenser 32 can be appropriately adjusted.

The first composition (P1) which is discharged by the first dispenser 30 is, for example, a fluid containing an inorganic particle (Pa) and a binder (Pb). The first composition (P1) is prepared by dispersing the inorganic particle (Pa) in the binder (Pb). The first composition (P1) fills the first dispenser 30 with the inorganic particle (Pa) dispersed in the binder (Pb). The inorganic particle (Pa) of the first composition (P1) is used to form a final formed body.

The second composition (P2) which is discharged by the second dispenser 32 is, for example, a fluid containing a curable support material (Ps). The support material (Ps) of the second composition (P2) is a sacrificial material used to form a support structure for supporting the inorganic particle (Pa) during a forming operation. The support structure formed by the support material (Ps) can be used to produce a formed body having a space therein, a formed body having a complicated three-dimensional shape, or the like.

The inorganic particle (Pa) is, for example, a particle consisting of any inorganic material such as metal, oxide, nitride, oxynitride, carbide, hydroxide, carbonate, or phosphate, or a combination thereof. The material of the inorganic particle (Pa) is not particularly limited.

Examples of the metal can be aluminum, titanium, iron, copper, stainless steel, nickel chromium steel, and the like.

Examples of the oxide can be silicon dioxide, aluminum oxide, magnesium oxide, titanium oxide, iron oxide, zinc oxide, yttrium oxide, zirconium oxide, barium titanate, and the like.

Examples of the nitride can be silicon nitride, aluminum nitride, titanium nitride, iron nitride, and the like.

Examples of the oxynitride can be silicon oxynitride, aluminum oxynitride, and the like.

Examples of the carbide can be silicon carbide, titanium carbide, boron carbide, zirconium carbide, and the like.

Examples of the hydroxide can be magnesium hydroxide, iron hydroxide, hydroxyapatite, and the like.

Examples of the carbonate can be calcium carbonate, sodium carbonate, potassium carbonate, lithium carbonate, and the like.

Examples of the phosphate can be iron phosphate, manganese phosphate, calcium phosphate, and the like.

The binder (Pb) of the first composition (P1) and the support material (Ps) of the second composition (P2) contain, for example, a photocurable composition which is cured by receiving light having a specific wavelength (for example, ultraviolet light). The photocurable composition contains, for example, a radically polymerizable monomer or a cationically polymerizable monomer, and a photopolymerization initiator. The radically polymerizable monomer is, for example, a (meth)acrylic monomer. The cationically polymerizable monomer is, for example, an epoxy compound or a cyclic ether compound. If the radically polymerizable monomer is used, the photopolymerization initiator is, for example, a radical photopolymerization initiator such as acetophenone. Further, if the cationically polymerizable monomer is used, the photopolymerization initiator is, for example, a cationic photopolymerization initiator such as an onium salt. The binder (Pb) and the support material (Ps) can contain the same kind of photocurable composition, and can also contain different kinds of photocurable compositions.

The content of the inorganic particle (Pa) in the first composition (P1) is, for example, 30 wt % to 90 wt %, preferably 40 wt % to 80 wt %, more preferably, 50 wt % to 70 wt %.

The first composition (P1) can contain any additive, such as a stabilizer, a dispersing agent, or a filler, in addition to the inorganic particle (Pa) and the binder (Pb). Likewise, the second composition (P2) can also contain any additive such as a stabilizer, a dispersing agent, or a filler, in addition to the support material (Ps).

Here, the landing surfaces on which the compositions (P1, P2) are discharged from the first dispenser 30 and the second dispenser 32 and land, respectively, can be a surface of any one, such as the stage 11, a substrate supported on the stage 11 or the like, or another first composition (P1) or second composition (P2) or a material film immobilized or solidified on the stage 11 or the substrate. Hereinafter, although the case where the discharged compositions (P1, P2) land on the stage 11 is mainly described, the following description is also applied to a case where the compositions (P1, P2) land on other landing surfaces such as the surfaces of other compositions (P1, P2). Further, in the present specification, the term 'stage' collectively refers to the substrate in a case where the substrate is disposed on the stage. Further, in the present specification, the term 'direction along the stage' means a direction along the surface (upper surface of the stage 11 in FIG. 1) facing the dispenser, which discharges the composition, among the respective surfaces of the stage, and the term 'direction orthogonal to the stage' means a direction orthogonal to the surface facing the dispenser, which discharges the composition, among the respective surfaces of the stage.

The immobilization unit 14 immobilizes the discharged compositions (P1, P2) onto the stage 11. For example, if the compositions (P1, P2) contain a photocurable composition, the immobilization unit 14 irradiates light (for example, ultraviolet light) to specific positions where the compositions (P1, P2) on the stage 11 are present. As a result, the immobilization unit 14 can apply optical stimulation to the compositions (P1, P2) on the stage 11, thereby curing the photocurable composition contained in the compositions (P1, P2). In the present specification, the term 'immobilization' means making a state where the position is not substantially changed in a case where an external force is not applied.

The immobilization unit 14 includes a first light emitting diode (LED) 40 and a second LED 42 as light sources. The first LED 40 and the second LED 42 are spaced apart from the stage 11 and disposed above the stage 11. The first LED 40 and the second LED 42 are movable at least in the x-direction and/or the y-direction by a first LED moving mechanism 44 and a second LED moving mechanism 46, respectively, and are rotatable around the z axis, for example, and are rotatable even in the plane parallel to the z axis. The LED moving mechanisms 44, 46 change the irradiation positions of the LEDs 40, 42 by changing the arrangements (for example, directions, positions, or the like) of the LEDs 40, 42, respectively. The LED moving mechanisms 44, 46 are, for example, articulated arms driven by a motor (not shown).

However, configurations of the LEDs 40, 42 are not limited to the above example. For example, at least one side of the LEDs 40, 42 can irradiate light from the side or the bottom of the stage 11. Further, the LED moving mechanisms 44, 46 can be omitted, and the arrangements of the LEDs 40, 42 can be fixed permanently, and the irradiation light can be scanned on the stage 11 by using, for example, a lens, a reflecting plate, or the like. The LED moving mechanisms 44, 46 can be used together with a lens, a reflecting plate, or the like.

Further, the component of the immobilization unit 14 is not limited to the LED, and can also be any element capable of irradiating light, such as a laser. Light irradiation can be performed locally on spots, having a size of about one drop to several drops of the composition (P1, P2), on the stage 11, and can also be performed on some compartments or the whole of the stage 11.

Here, for example, if a one-dimensional array type LED disposed to cover the entire width of the stage 11 along the x-direction or the y-direction is used, it is sufficient as long as the LED can move only in any one direction of the x-direction and the y-direction. Further, for example, if the LEDs 40, 42 capable of irradiating light to the whole of the stage 11 are used, the components which control the light irradiation positions of the LEDs 40, 42, such as the LED moving mechanisms 44, 46, a lens, or a reflecting plate, are unnecessary.

The heating unit 16 locally applies heat to a specific position on the stage 11 by, for example, irradiating a heat ray. As a result, the heating unit 16 can perform degreasing of the first composition (P1) immobilized onto the stage 11 or sintering or melting-solidification of the inorganic material contained in the first composition (P1). Here, the term 'sintering' means bonding solid particles (for example, powder of metal oxides, metal nitrides, or the like) of an inorganic material to each other by heating the solid particles to a temperature lower than the melting point of the inorganic material. The term 'melting-solidification' means melting a solid particle (for example, particle of a metal or an alloy) of an inorganic material by heating the solid particle to a temperature equal to or higher than the melting point of the inorganic material, and then solidifying the metal particle or the alloy particle by natural cooling or the like. In the present specification, the sintering and the melting-solidification are collectively referred to as 'thermal solidification'.

The heating unit 16 includes, as heat sources, a degreasing laser (degreasing heat source) 50 and a thermal solidification laser (thermal solidification heat source) 52. The degreasing laser 50 and the thermal solidification laser 52 are spaced apart from the stage 11 and disposed above the stage 11. The degreasing laser 50 is movable at least in the x-direction and the y-direction by a degreasing laser moving mechanism 54, and is rotatable, for example, around the z axis, and is rotatable even in the plane parallel to the z axis. The thermal solidification laser 52 is movable at least in the x-direction and the y-direction by a thermal solidification laser moving mechanism 56, and is rotatable, for example, around the z axis, and is rotatable even in the plane parallel to the z axis. The degreasing laser moving mechanism 54 and the thermal solidification laser moving mechanism 56 are, for example, articulated arms driven by a motor (not shown).

The degreasing laser 50 can perform laser irradiation to the first composition (P1) to heat the first composition (P1) up to a temperature of, for example, 200° C. to 800° C., preferably 300° C. to 500° C., thereby performing the degreasing of the first composition (P1). The thermal solidification laser 52 can perform laser irradiation to the first composition (P1) to heat the first composition (P1) up to a temperature of, for example, 500° C. to 4000° C., preferably 1000° C. to 3000° C., thereby performing the thermal solidification of the first composition (P1). However, the heating temperature is not limited thereto, and can be changed appropriately according to the kind or the like of the inorganic particle (Pa) or the binder (Pb) contained in the first composition (P1). Further, by using two identical laser devices as the degreasing laser 50 and the thermal solidification laser 52 to adjust the output, the degreasing laser 50 and the thermal solidification laser 52 can also perform heating up to different temperatures. Further, both degreasing and thermal solidification can also be performed by using a single laser. In this case, the output of the single laser can be changed in the degreasing step and the thermal solidification step, and the degreasing and the thermal solidification can also be performed at once by heating the first composition (P1) up to a thermal solidification temperature by the single laser while omitting the degreasing step.

Further, the component of the heating unit 16 is not limited to the laser, and can also be any element capable of the local heating such as an electron beam device. Further, the heating is not limited to the heating from above, and for example, can also be the local heating from below.

The information acquisition unit 18 monitors the shapes of the compositions (P1, P2) on the stage 11, and acquires information of the compositions (P1, P2). The information acquisition unit 18, for example, includes a photographing device 70 spaced apart from the stage 11 and disposed above the stage 11.

The information acquisition unit 18 photographs, by the photographing device 70, the compositions (P1, P2) on the stage 11. The information acquisition unit 18 acquires, based on the photographed image, information on the landing positions and timings of the compositions (P1, P2) discharged toward the stage 11, the geometric states such as the sizes or positions of the compositions (P1, P2) already positioned on the stage 11, and furthermore, the shapes of the compositions (P1, P2) (for example, the figure of heat shrinkage of the first composition (P1)).

The photographing device 70 is movable at least in the x-direction and/or the y-direction by a photographing device moving mechanism 72, and is rotatable, for example, around the z axis, and is rotatable even in the plane parallel to the z axis. The photographing device moving mechanism 72 is, for example, an articulated arm driven by a motor (not shown). However, the arrangement of the photographing device 70 is not limited to the above example, and one or a plurality of photographing devices 70 can also be disposed at the side of the stage 11 or the like.

Further, the component of the information acquisition unit 18 is not limited only to the photographing device 70, and can be a vibration detecting device, a heat detecting device, or the like installed to the stage 11, can also be a radiation analysis device (for example, an X-ray diffraction device or an energy dispersion type X-ray analysis device), an ultrasonic analysis device, or the like which observes the figure of the stage surface by irradiating radiation or ultrasonic waves onto the stage 11, and these can be used together.

The removal unit 20 removes at least a portion of the second composition (P2) (support material (Ps)) on the stage 11. The removal unit 20 has, for example, a heating device 80 and a removal laser 82. The heating device 80 can extensively decompose the support material (Ps) on the stage 11 by heating all or some of the interior of the chamber 10. The removal laser 82 can, for example, irradiate laser beam to the support material (Ps) to be removed to apply heat, thereby locally decomposing the support material (Ps). However, a configuration of the removal unit 20 is not limited to the above example. For example, only one side of the heating device 80 and the removal laser 82 can be used, a plurality of removal lasers 82 can be installed, and another heating means such as a heating mean for heating the stage 11 can be installed, and these can be used together.

A control unit 22 (see FIG. 2) receives input data, such as three-dimensional shape data of the formed body to be produced to control each component of the forming apparatus 1. The control unit 22 is realized by, for example, a processor such as a Central Processing Unit (CPU) or a Graphics Processing Unit (GPU). The operation of the control unit 22 will be described later.

[System Configuration]

Next, a system configuration of the forming apparatus 1 of the first embodiment will be described with reference to FIG. 2.

FIG. 2 is a block diagram showing an example of the system configuration of the forming apparatus 1 of the first embodiment.

An input unit 90 receives the input data of the formed body to be produced, and transmits the input data to the control unit 22.

The information acquisition unit 18 acquires information of the compositions (P1, P2) on the stage 11, and transmits the information to the control unit 22, by using the photographing device 70. The information includes, for example, the positions, sizes, shapes, the shapes of heat shrinkage, and the like of the compositions (P1, P2) already positioned on the stage 11. Further, the information acquisition unit 18 can also acquire, for example, the landing information of the compositions (P1, P2) on the stage 11 (for example, the landing positions, timings, or the like of the compositions (P1, P2)), by the photographing device 70.

The control unit 22 determines, based on the input data from the input unit 90, the information acquired from the information acquisition unit 18, or the like, a next position on the stage 11 where the compositions (P1, P2) are to be discharged (hereinafter, collectively referred to as 'discharge position'), or each next position on the stage 11 where each of the first LED 40, the second LED 42, the degreasing laser 50, and the thermal solidification laser 52 is to be irradiated (hereinafter, collectively referred to as 'irradiation position'). According to the thus determined discharge positions or irradiation position, the control unit 22 controls the stage moving mechanism 11a to move the stage 11 to an appropriate position, and controls the dispenser moving mechanisms 34, 36, the first LED moving mechanism 44, the second LED moving mechanism 46, the degreasing laser moving mechanism 54, and the thermal solidification laser moving mechanism 56 to approximately dispose the dispensers 30, 32, the LEDs 40, 42, the degreasing laser 50, and the thermal solidification laser 52.

Further, the control unit 22 controls the dispensers 30, 32 to discharge the appropriate amounts of the compositions (P1, P2) at appropriate timings, and controls the LEDs 40, 42, the degreasing laser 50, and the thermal solidification laser 52, respectively, to irradiate light for curing the binder (Pb) or laser beam for performing degreasing and thermal solidification at an appropriate timing, based on the input data, the information from the information acquisition unit 18, or the like.

Further, the control unit 22 can determine a next position on the stage 11 to be photographed by the photographing unit 70 (hereinafter, referred to as 'photographing position'), based on the input data, the information from the information acquisition unit 18, or the like. Based on these photographing positions, the control unit controls the photographing device moving mechanism 72 to appropriately dispose the photographing device 70. Further, the control unit 22 controls the photographing device 70 to perform photographing at an appropriate timing to acquire information.

Further, the control unit 22 can determine a next position on the stage 11 where the second composition (P2) is to be removed (hereinafter, referred to as 'removal position'), based on the input data, the information from the information acquisition unit 18 (for example, image data by the photographing device 70 or the like), or the like. Based on this position, the control unit 22 controls a removal laser moving mechanism 84 to appropriately dispose the removal laser 82, and controls the heating device 80 and the removal laser 82 to perform the heating or the like at an output suitable for removing the second composition (P2).

As described above, the control unit 22 can perform a feedback control of the supply unit 12, the immobilization unit 14, the heating unit 16, the information acquisition unit 18, and the removal unit 20, based on the states of the compositions (P1, P2) which has already been immobilized and fixed on the stage 11.

For example, if the actual position of the first composition (P1) thermally solidified or the second composition (P2) immobilized differs from the discharge position originally supposed due to the position shifts of the discharged compositions (P1, P2), the heat shrinkage of the first composition (P1), or the like, the control unit 22 can detect such a position shift, and modify the next discharge positions of the discharged compositions (P1, P2) or the next irradiation positions of the immobilization unit 14, the heating unit 16, and the like, based on the image data from the photographing device 70 or the like.

Further, each control by the control unit 22 is not limited to the above example. For example, the control unit 22 cannot perform the feedback control with respect to some or can perform the feedback control with respect to none of components.

[Method of Producing the Formed Body]

Next, an example of a method of producing a formed body by the forming apparatus 1 of the first embodiment will be described with reference to FIGS. 3 to 5.

FIGS. 3A to 3F and 4A to 4J are diagrams showing an example of a method of producing a formed body by the forming apparatus 1 of the first embodiment.

FIGS. 3A to 3F shows a series of processes (a) to (f) from the discharge to the thermal solidification of the first composition (P1) in the producing method. FIGS. 3A to 3F focuses on the first composition (P1), and does not show the second composition (P2).

In FIG. 3A, the first composition (P1) is discharged from the first dispenser 30 toward the stage 11. Here, a thermally solidified body (C) already thermally solidified, and inorganic particles (Da to Dd) surrounded by a cured binder (B) are formed on the stage 11. Further, in FIG. 3, the first composition (P1) is discharged in order from the left side (−x-direction) to the right side (+x-direction) in the figure. That is, as the process proceeds, the first dispenser 30, the first LED 40, the degreasing laser 50, and the thermal solidification laser 52 move in the +x-direction with respect to the stage 11.

In FIG. 3B, the discharged first composition (P1) lands beside the inorganic particle (Dd). The information acquisition unit 18 acquires information on the landing position and timing of the first composition (P1). Immediately after landing, the binder (Pb) of the discharged first composition (P1) surrounds the inorganic particle De(Pa), and has fluidity. Toward this binder (Pb), the first LED 40 of the immobilization unit 14 irradiates light having a wavelength suitable for curing the binder (Pb).

In FIG. 3C, the binder (Pb) containing a photocurable composition is cured to constitute a portion of the cured binder (B). As a result, the inorganic particle (De) contained in the discharged first composition (P1) is immobilized onto the stage 11. Next, the degreasing laser 50 of the heating unit 16 irradiates laser beam near the inorganic particle (Da) to apply heat to the binder (B). Further, here, although degreasing is performed near the inorganic particle (Da) spaced at a certain distance apart from the inorganic particle (De) immobilized immediately before, the distance between a position where the first composition (P1) is immobilized and a position where the first composition (P1) is degreased (and thermally solidified) immediately thereafter can be determined according to various conditions, such as the property or discharge rate of the first composition (P1), and the intensity of the degreasing laser 50. For example, the position where the first composition (P1) is degreased can be the same as the position where the first composition (P1) is immobilized (that is, near the inorganic particle (De) immobilized immediately before).

In FIG. 3D, the binder (B) near the inorganic particle (Da) is degreased by the degreasing laser 50, such that the inorganic particle (Da) is exposed. Next, the thermal solidification laser 52 of the heating unit 16 irradiates laser beam near the boundary between the thermally solidified body (C) and the inorganic particle (Da) to apply heat to the thermally solidified body (C) and the inorganic particle (Da). As a result, the thermal solidification occurs between the thermally solidified body (C) and the inorganic particle (Da).

In FIG. 3E, the inorganic particle (Da) is integrated with the thermally solidified body (C) by the thermal solidification between the thermally solidified body (C) and the inorganic particle (Da). Next, the control unit 22 determines one side or both sides of the next discharge position of the first composition (P1) and the next irradiation positions of the immobilization unit 14 and the heating unit 16, in consideration of the shape of thermal shrinkage of the first composition (P1) on the stage 11 or the like, based on the image data on the stage 11 received from the information acquisition unit 18 or the like. Based on the determined discharge position or irradiation positions, the first dispenser moving mechanism 34, the first LED moving mechanism 44, the degreasing laser moving mechanism 54, and the thermal solidification laser moving mechanism 56 move the first dispenser 30, the first LED 40, the degreasing laser 50, and the thermal solidification laser 52 in the +x-direction with respect to the stage 11 (here, the first LED 40, the degreasing laser 50, and the thermal solidification laser 52 are not shown). This moving direction or moving distance is changed according to the next place where the first composition (P1) is to be discharged. In this example, the next discharge position is right next to the inorganic particle (De) (see FIG. 3F). Of course, according to the structure of the formed body to be produced, a section where the first composition (P1) is not discharged can be present between the inorganic particle (De) and the next discharge position.

In FIG. 3F, as in FIG. 3A, the first composition (P1) is discharged again from the first dispenser 30 toward the stage 11. Thereafter, the operations described with reference to FIGS. 3B to 3E are repeated.

For example, after the above process has been performed from one end to the other end of the stage 11 along the x-direction, the first dispenser 30, the first LED 40, the degreasing laser 50, and the thermal solidification laser 52 are slightly moved along the y-direction, and the process is performed again from one end to the other end of the stage 11 along the x-direction. As described above, by repeating the process along the x-direction while moving the discharge position and the irradiation position little by little in the y-direction, each step of the discharge, immobilization, degreasing, and thermal solidification of the first composition (P1) can be executed throughout the stage 11.

Further, the method of moving the first dispenser 30, the first LED 40, the degreasing laser 50, and the thermal solidification laser 52 with respect to the stage 11 is not limited thereto. For example, the process can also be performed along the y-direction rather than the x-direction. Further, rather than repeating the movement along a specific direction, it is possible to repeatedly and directly move the first dispenser 30, the first LED 40, the degreasing laser 50, and the thermal solidification laser 52 to any position where the first composition (P1) is to be discharged. For example, the nearest position from the current position of the first dispenser 30 among the respective positions where the first composition (P1) is to be discharged can be selected as the next discharge position.

The forming process of the second composition (P2) is also performed basically in the flow as in FIGS. 3A to 3F. However, the second composition (P2) is immobilized by the second LED 42, but is not degreased nor thermally solidified. That is, according to FIGS. 3A to 3F, if the second composition (P2) is discharged from the second dispenser 32 toward the stage 11, the photocurable composition contained in the support material (Ps) of the second composition (P2) is cured by the light irradiation of the second LED 42, and as a result, the second composition (P2) (support material (Ps)) is immobilized on the stage 11. Thereafter, without performing the degreasing and the thermal solidification, the second dispenser moving mechanism 36 and the second LED moving mechanism 46 move the second dispenser 32 and the second LED 42 in the +x-direction, respectively, based on the next discharge position of the second composition (P2) and the next irradiation position of the second LED 42. By repeating a cycle including such discharge and immobilization, a support structure (S) (see FIGS. 4A to 4J) for supporting the inorganic material is formed.

FIGS. 4A to 4J shows a series of processes (a) to (j) of a method of producing a formed body by the forming apparatus 1. Here, although the method of producing layers of a formed body from below to above one by one is described as an example, the method of producing a formed body is not limited to this example.

In FIG. 4A, the first composition (P1) is discharged from the first dispenser 30 toward the stage 11. Next, the first LED 40 irradiates light to the discharged first composition (P1).

In FIG. 4B, the binder (Pb) of the first composition (P1) becomes a cured binder (B), and the first composition (P1) is immobilized on the stage 11, by the light irradiation from the first LED 40. The immobilized first composition (P1) is heated by the degreasing laser 50, such that the binder (B) of the first composition (P1) is degreased. Next, the degreased first composition (P1) is heated by the thermal solidification laser 52, such that the first composition (P1) is thermally solidified. A series of processes composed of the discharge, immobilization, degreasing, and thermal solidification of the first composition (P1) are repeated.

In FIG. 4C, by the repetition of the process, the thermally solidified body (C) is formed on a portion, made of the inorganic material of the first composition (P1), in a first layer of the formed body. Next, the second composition (P2) containing the support material (Ps) is supplied from the second dispenser 32 to a portion, which finally becomes a space having no material, in the first layer of the formed body. The second LED 42 irradiates light to the discharged second composition (P2).

In FIG. 4D, the support material (Ps) of the second composition (P2) is cured to form the support structure (S), and the second composition (P2) is immobilized on the stage 11, by the light irradiation from the second LED 42. Such series of processes composed of the discharge and immobilization of the second composition (P2) are repeated.

In FIG. 4E, by the repetition of the process, the support structure (S) is formed on a portion, which becomes a space having no material, in the first layer of the formed body. Next, in order to form a second layer, the discharge, immobilization, degreasing, and thermal solidification of the first composition (P1) are performed again.

In FIG. 4F, the first composition (P1) is supplied to a portion, made of the inorganic material of the first composition (P1), in the second layer of the formed body and immobilized, degreased, and thermally solidified. However, the first composition (P1) supplied near the support structure (S) is only immobilized by the binder (B) cured by the first LED 40, and is not degreased nor thermally solidified. This is because when performing heating up to a temperature of the degreasing or the thermal solidification near the support structure (S), there is the possibility of decomposing a general photocurable composition constituting the support structure (S). Next, as in FIG. 4C, the second composition (P2) is supplied from the second dispenser 32 to a portion, which becomes a space having no material, in the second layer of the formed body. The second LED 42 irradiates light to the discharged second composition (P2).

In FIG. 4G, the support structure (S) is formed on a portion, which becomes the space having no material, in the second layer of the formed body. Continuously, a third layer is formed in the same manner as in the second layer.

In FIG. 4H, the third layer made of the first composition (P1) and the second composition (P2) is formed on the second layer. Here, as in the second layer, the first composition (P1) is not degreased nor thermally solidified near the support structure (S). Continuously, a fourth layer is formed. In this example, the fourth layer is entirely made of the inorganic material of the first composition (P1).

In FIG. 4I, the fourth layer made of the first composition (P1) is formed on the third layer. Here, as in the second layer and the third layer, the first composition (P1) is not degreased nor thermally solidified near the support structure (S). Finally, in order to remove the support structure (S) and the binder (B), the heating treatment is performed by the heating device 80 or the removal laser 82 of the removal unit 20.

In FIG. 4J, the support structure (S) and the binder (B) are heated and removed by the removal unit 20 to form a formed body (M) of the inorganic material having a space. As a result, the formed body having a space therein or the formed body having a complicated three-dimensional shape can be produced by the forming apparatus 1.

Figure 5:
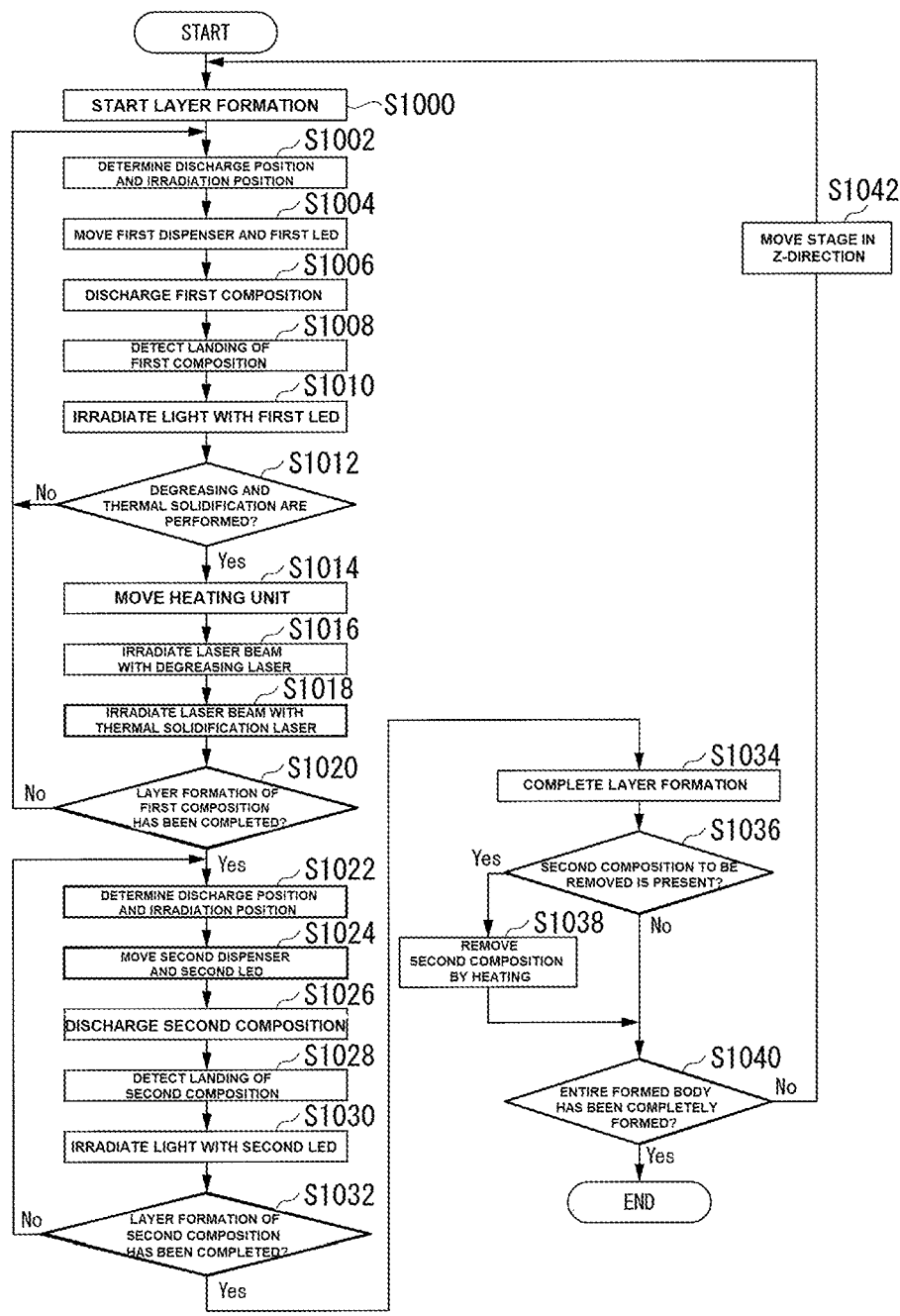
FIG. 5 is a flowchart showing an example of the method of producing a formed body by the forming apparatus of the first embodiment.

FIG. 5 is a flowchart showing an example of the method of producing a formed body by the forming apparatus 1 in the first embodiment.

If formation of the first layer on the stage 11 is started (S1000), the control unit 22 first determines the initial discharge position and irradiation position, based on input data of the three-dimensional formed body received from the input unit 90 (S1002). Next, the control unit 22 directs the first dispenser moving mechanism 34 and the first LED moving mechanism 44 to move the first dispenser 30 and the first LED 40 to appropriate arrangements, based on the determined discharge position and irradiation position (S1004).

Next, the control unit 22 directs the first dispenser 30 to discharge the first composition (P1) toward the stage 11 (S1006). If the first composition (P1) is discharged to land on the stage 11, the information acquisition unit 18 detects the landing of the first composition (P1) (S1008). For example, the information acquisition unit 18 detects the landing positions and timings of the first composition (P1) by comparing images by performing photographing on the stage 11 continuously or regularly by the photographing device 70.

Next, the control unit 22 directs the first LED 40 to irradiate light for immobilizing the landing first composition (P1) on the stage 11 (here, curing the binder (Pb)) (S1010). As a result, the binder (Pb) containing a photocurable composition is cured, such that the first composition (P1) is immobilized on the stage 11.

Next, the control unit 22 determines whether to degrease and thermally solidify the first composition (P1) (S1012). For example, the control unit 22 determines whether the support structure (S) having the cured support material (Ps) of the second composition (P2) is present near the irradiation positions of the degreasing laser 50 and the thermal solidification laser 52, based on the input data or the actual photographing data by the photographing device 70. If it is determined that the support structure (S) has been present near the irradiation position, the control unit 22 determines that the first composition (P1) is not degreased nor thermally solidified (S1012: NO), and the flow returns to the S1002. In the S1002, the control unit 22 determines a next discharge position and a next irradiation position, based on the input data or the information (for example, the photographing data of the stage 11 acquired by the photographing device 70) acquired by the information acquisition unit 18.

Meanwhile, if it is determined that the support structure (S) has not been present near the irradiation position, the control unit 22 determines that the first composition (P1) is degreased and thermally solidified (S1012: YES). In this case, the control unit 22 directs the degreasing laser moving mechanism 54 and the thermal solidification laser moving mechanism 56 to move the degreasing laser 50 and the thermal solidification laser 52 to appropriate arrangements, based on the irradiation position determined in the S1002 (S1014).

Next, the control unit 22 directs the degreasing laser 50 to irradiate laser beam for degreasing the binder (Pb) of the first composition (P1) on the stage 11 (S1016). The irradiation position of the degreasing laser 50 can be the same as the irradiation position of the first LED 40, and as described with reference to FIGS. 3A to 3F, can be another position which is spaced at a certain distance apart from the irradiation position of the first LED 40 where the first composition (P) has been immobilized immediately before.

Next, the control unit 22 directs the thermal solidification laser 52 to irradiate laser beam for thermally solidifying the inorganic particle (Pa) of the first composition (P1) on the stage 11 (S1018). The irradiation position of the thermal solidification laser 52 can be the same as the irradiation position of the degreasing laser 50, and can be another position which is spaced at a certain distance apart therefrom.

Next, the control unit 22 determines whether the forming of a portion, made of the first composition (P1), in the first layer has been completed, based on the input data or the information of the first composition (P1) on the stage 11 acquired by the information acquisition unit 18 (S1020). If it is determined that the forming of the portion, made of the first composition (P1), in the first layer has not been completed (S1020: NO), the flow returns to the S1002. That is, the control unit 22 determines a next discharge position where the first composition (P1) is to be discharged, and determines a next irradiation position of the first LED 40, the degreasing laser 50, or the thermal solidification laser 52, based on the information of the first composition (P1) on the stage 11 acquired by the information acquisition unit 18. Thereafter, the aforementioned forming process of the discharge, immobilization, degreasing, and thermal solidification of the first composition (P1) is executed again.

Here, the next discharge position is determined by any method. For example, the next discharge position can be, as described above, determined according to the order in which the process first proceeds from one end to the other end of the stage 11 along the x-direction, and then proceeds slightly in the y-direction, and proceeds again from one end to the other end of the stage 11 along the x-direction, and proceeds slightly in the y-direction again, and the like, and can also be determined based on the distance from the current position of the first dispenser 30.

Meanwhile, if it is determined that forming of the portion, made of the first composition (P1), in the first layer has been completed (S1020: YES), the control unit 22 determines the discharge position of the second composition (P2) and the irradiation position of the second LED 42, based on the input data of the formed body (S1022). Next, the control unit 22 directs the second dispenser moving mechanism 36 and the second LED moving mechanism 46 to move the second dispenser 32 and the second LED 42 to appropriate arrangements, based on the determined discharge position and irradiation position (S1024).

Next, the control unit 22 directs the second dispenser 32 to discharge the second composition (P2) toward the stage 11 (S1026). If the second composition (P2) is discharged and lands on the stage 11, the information acquisition unit 18 detects the landing of the second composition (P2) by the photographing device 70 or the like (S1028).

Next, the control unit 22 directs the second LED 42 to irradiate light for immobilizing the landing second composition (P2) on the stage 11 (here, curing the support material (Ps)) (S1030). As a result, the support material (Ps) containing a photocurable composition is cured, such that the second composition (P2) is immobilized on the stage 11.

Next, the control unit 22 determines, in view of the input data, whether the forming of a portion, made of the second composition (P2), in the first layer (that is, portion, which finally becomes a space having no material, in the first layer of the formed body) has been completed (S1032). If it is determined that the forming of the portion, made of the second composition (P2), in the first layer has not been completed (S1032: NO), the flow returns to the S1022. That is, the control unit 22 determines a next discharge position where the second composition (P2) is to be discharged, and determines a next irradiation position of the second LED 42, based on the information of the second composition (P2) on the stage 11 acquired by the information acquisition unit 18 or the like. Thereafter, the forming process of the discharge and immobilization of the second composition (P2) is executed again.

Meanwhile, if it is determined that the forming of the portion, made of the second composition (P2), in the first layer has been completed (S1032: YES), the control unit 22 determines that the formation of the first layer has been completed (S1034).

Next, the control unit 22 determines, in view of the input data or the like, whether the second composition (P2) to be removed from the stage 11 is present at at the moment (S1036). If it is determined that the second composition (P2) to be removed at the moment has been present (S1036: YES), the control unit 22 directs the removal unit 20 to remove the second composition (P2) to be removed (S1038). For example, if it is determined that the entire second composition (P2) within the chamber 10 should be removed, the control unit 22 can direct the heating device 80 to heat the entire interior of the chamber 10 up to a temperature at which the second composition (P2) is decomposed. Further, for example, if it is determined that only a portion of the second composition (P2) within the chamber 10 should be removed, the control unit 22 can direct the removal laser moving mechanism 84 to move the removal laser 82 to appropriate arrangement, and direct the removal laser 82 to irradiate laser beam toward the second composition (P2) to be removed.

If the removing has been completed, or if it is determined that the second composition (P2) to be removed from the stage 11 at the moment has not been present (S1036:NO), the control unit 22 determines, in view of the input data, whether the formation of the entire formed body has been completed (S1040). If it is determined that the formation of the entire formed body has not been completed (S1040:NO), the control unit 22 directs the stage moving mechanism 11a to move the stage 11 in the z-direction (for example, to descend the stage 11 by one layer in the z-direction) (S1042). Thereafter, the flow returns to the S1000, and the formation of the second layer is started.

Meanwhile, if it is determined that the formation of the entire formed body has been completed (S1040:YES), the formed body is completely produced. The formation from the first layer to a final layer is completed, thereby obtaining the formed body having any three-dimensional shape. Since the unnecessary support structure (S) is heated and removed by the removing of S1038, the formed body having a space therein or the formed body having a complicated three-dimensional shape can be produced.

As described above, the forming apparatus 1 can form each layer of the three-dimensional formed body by repeating the forming cycle including each step (S1002, S1004, S1006, S1008, S1010, S1012, S1014, S1016, and S1018) of the position control, discharge, immobilization, degreasing, and thermal solidification of the first composition (P1), and repeating the forming cycle including each step (S1022, S1024, S1026, S1028, and S1030) of the position control, discharge, and immobilization of the second composition (P2), and can form the three-dimensional formed body by repeating such formation of layers from the first layer to the final layer. In the present specification, the term 'forming cycle' means a series of processes which are repeated for producing the formed body, which is composed of two or more steps (for example, a discharge step and a thermal solidification step). Here, the term 'repeating' means that the process is performed at least twice continuously or intermittently, and also includes, for example, a case where another process is interposed between any repeating unit and the next repeating unit thereof.

It is not necessary to necessarily perform all of the above steps in each forming cycle, and one or more of the respective steps can be omitted in some or all of the forming cycles. For example, in some forming cycles, only the position control (S1002, S1004) of the first dispenser 30 and the first LED 40, and the discharge (S1006, S1008) and immobilization (S1010) of the first composition (P1) can be performed, and in other forming cycles, only the position control (S1002, S1014) of the degreasing laser 50 and the thermal solidification laser 52, and the degreasing (S1016) and the thermal solidification (S1018) of the first composition (P1) can be performed. For example, in some forming cycles, only the thermal solidification (S1018) can be performed, and in some forming cycles, the thermal solidification cannot be performed.

Further, the order or the number of each step can be arbitrarily changed, and any other step can also be added. For example, the first LED 40 can be moved after the discharging of the first composition (P1) (S1006), and the second LED 42 can be moved after the discharging of the second composition (P2) (S1026). Further, the timing of the information acquisition by the information acquisition unit 18 is not limited to when determining the discharge position and the irradiation position, and the information can be acquired at any timing.

The forming cycle can be repeated at least along the stage 11. Here, the term 'along the stage' means 'along the surface facing the dispenser which discharges the composition among the respective surfaces of the stage'. Further, the term 'repeated at least along the stage' means that a plurality of forming cycles are performed along the stage, regardless of whether the forming cycle is repeated along the direction intersecting the stage. That is, as long as two or more forming cycles are performed continuously or intermittently along the stage, not only a case where the forming cycle is repeated along the stage but also a case where the forming cycle is repeated along the direction intersecting the stage correspond to the 'repeated at least along the stage'. Further, in the present specification, the position where the forming cycle is performed corresponds to the position where the discharged composition lands and the position where thermal solidification occurs, for example, if the forming cycle includes the discharge step and the thermal solidification step. Therefore, the term 'forming cycle is performed along the stage' means that, for example, if the forming cycle includes the discharge step and the thermal solidification step, the position where the composition lands and the position where the thermal solidification occurs follow the stage in a plurality of forming cycles.

The forming cycle can be repeated within the same plane. Here, the term 'repeated within the same plane' means that four or more forming cycles sufficient to define a plane in the three-dimensional space are repeated on the plane.

In the above-described flow, with respect to each layer of the formed body, the first composition (P1) is first discharged, immobilized, degreased, and thermally solidified once and the layer formation of the first composition (P1) is completed, and then the second composition (P2) is discharged, immobilized, degreased, and thermally solidified, but each treatment of the first composition (P1) and the second composition (P2) can be performed in any order. For example, the treatment (discharge, immobilization, degreasing, or thermal solidification) of the second composition (P2) can be performed before the layer formation of the first composition (P1) is completed. For example, the treatments of the first composition (P1) and the second composition (P2) can be performed together.

[Effects]

In accordance with the forming apparatus 1 according to the first embodiment described above, the forming cycle including the supply of the first composition (P1) and the thermal solidification of the first composition (P1) is repeatedly performed. That is, the first composition (P1) is thermally solidified locally, and the next first composition (P1) is further supplied even after the thermal solidification operation has been performed. For example, since the immobilization of the first composition (P1) (curing of the binder (Pb)), the degreasing of the binder (Pb), and the thermal solidification of the inorganic particle (Pa) are sequentially performed so as to follow the supply of the first composition (P1) from the supply unit 12, these processes can be subdivided.

Since the degreasing process is subdivided and a small amount of the first composition (P1) is degreased, the binder (Pb) can be removed by each degreasing operation, thereby suppressing the binder (Pb), the decomposed components of the binder (Pb), and the like from remaining in the formed body, as compared with the case where the entire formed body is degreased at once after the three-dimensional shaping of a binder having the inorganic particle dispersed therein has been performed as in the conventional stereolithography. Further, in the case where the entire formed body is degreased as in the conventional stereolithography, a gap corresponding to the volume of the binder can occur inside the formed body, such that there is a case where the finished formed body can be shrunk by the size of the gap, but if the degreasing process is subdivided as in the present embodiment, even if such a gap is generated, the first composition (P1) is continuously supplied, such that the gap can be filled with the next first composition (P1), thereby suppressing such shrinkage.

Further, since the thermal solidification process is subdivided and a small amount of the first composition (P1) is thermally solidified, cracks or breakage of the thermally solidified body can be suppressed from occurring due to the difference in thermal expansion coefficients for every site of the formed body, as compared with the case where the entire formed body degreased after the three-dimensional shaping has been once thermally solidified as in the conventional stereolithography. Even if cracks or the like has occurred due to thermal expansion and thermal shrinkage, the first composition (P1) is supplied continuously, such that such a defect can be redeemed with the next first composition (P1), thereby suppressing the adverse effect of such a defect. As described above, if the discharge of the first composition (P1) is controlled in a feedback manner based on the thermal solidification result, it is possible to produce the solid formed body having a desired shape and size.

Further, in the case where three-dimensional forming is performed by curing a precursor accommodated in a liquid tank for each layer as in the conventional stereolithography, it is necessary to remove an uncured binder after curing only a necessary portion for each layer, but the forming apparatus 1 according to the present embodiment does not require such a process. For this reason, it is possible to reduce the cost of the forming process and to improve efficiency. Further, it is possible to reduce the restrictions in the conventional stereolithography, thereby improving the degree of freedom of the three-dimensional shaping of an inorganic material.

As a result, an inorganic material-containing formed body having improved quality can be produced.

Further, separately from the first composition (P1), by using the second composition (P2) containing the support material (Ps), it is possible to use the support structure made of the support material (Ps). Even in the process of stacking the first composition (P1) on the stage 11 in the bottom-up manner, the formed body having a space therein, the formed body having a complicated three-dimensional shape, or the like can be produced by such a support structure, thereby significantly improving the degree of freedom of the three-dimensional shaping.

Further, according to the present embodiment, the forming apparatus 1 includes the first LED 40 and the second LED 42 as the immobilization unit 14, and includes the degreasing laser 50 and the thermal solidification laser 52 as the heating unit 16. As a result, it is possible to separately control the execution position, timing, or the like of each process of immobilization, degreasing, and thermal solidification, thereby efficiently executing the sequential forming processes as described above.

Further, in the above example, although the photocurable composition has been used as the binder (Pb) of the first composition (P1) and the support material (Ps) of the second composition (P2), the binder (Pb) and the support material (Ps) are not limited thereto. For example, a thermosetting composition such as phenol resin or polyurethane can be used as the binder (Pb) and the support material (Ps), and a heat source (for example, a laser) for curing the thermosetting resin can be used instead of the LED as the component of the immobilization unit 14. In this case, the binder (Pb) and the support material (Ps) made of the thermosetting resin are cured by the heat from the heat source, such that the first composition (P1) and the second composition (P2) are immobilized on the stage 11. Alternatively, a thermoplastic composition such as polyethylene or polyethylene terephthalate can be used as the binder (Pb) and the support material (Ps), and the first composition (P1) and the second composition (P2) can be supplied toward the stage 11 with the binder (Pb) and the support material (Ps) melted by heating the first composition (P1) and the second composition (P2) in advance. In this case, the binder (Pb) and the support material (Ps) made of the thermoplastic resin are naturally cooled on the stage 11, such that the first composition (P1) and the second composition (P2) are immobilized on the stage 11.

Further, in the above example, although the removal unit 20 including the heating device 80 and the removal laser 82 has been used, the degreasing laser 50 or the thermal solidification laser 52 can be used to remove the support structure (S). In this case, the removal unit 20 can be omitted.

Second Embodiment

Next, a second embodiment will be described with reference to FIGS. 6 to 9. The second embodiment differs from the first embodiment in that the support material is removed by a remover. Further, configurations except for configurations described below are the same as those in the first embodiment.

[Configuration]

Figure 6:
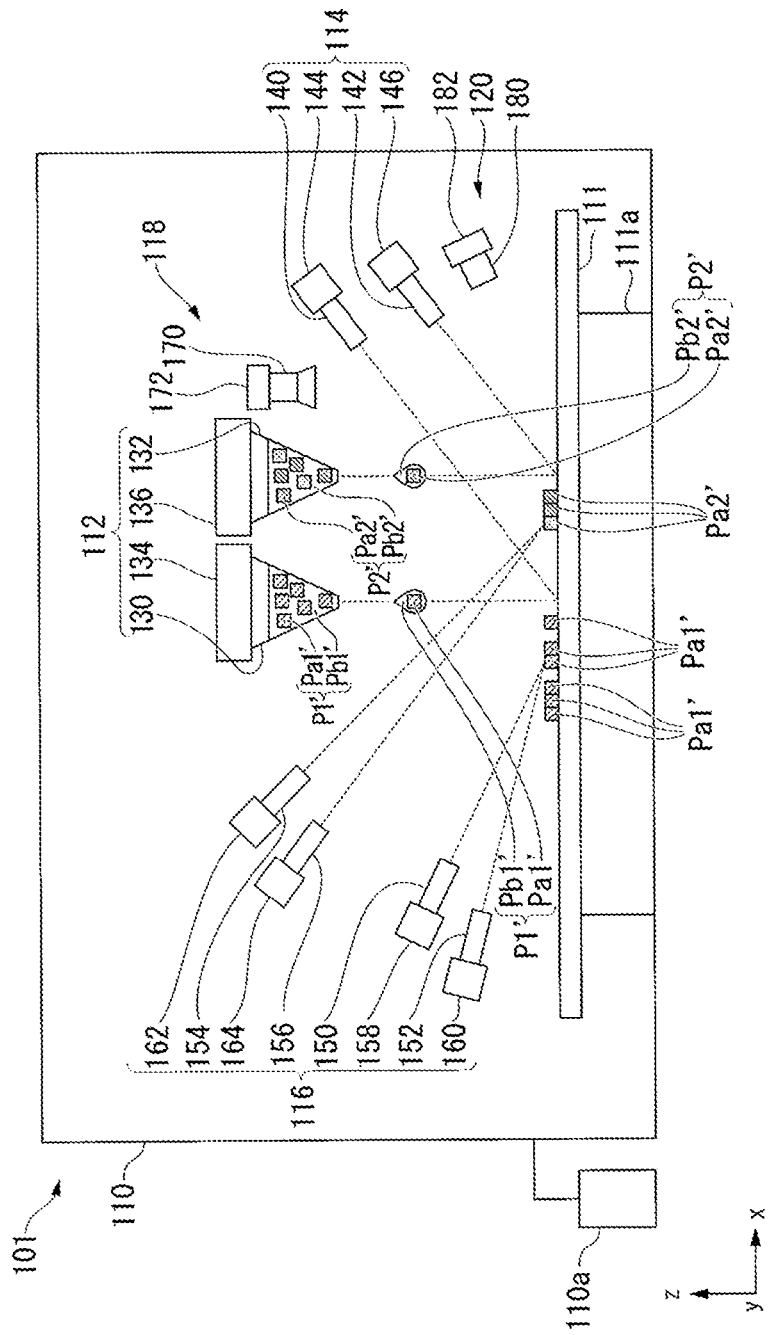
FIG. 6 is a schematic front diagram showing a forming apparatus according to a second embodiment.
Figure 7:
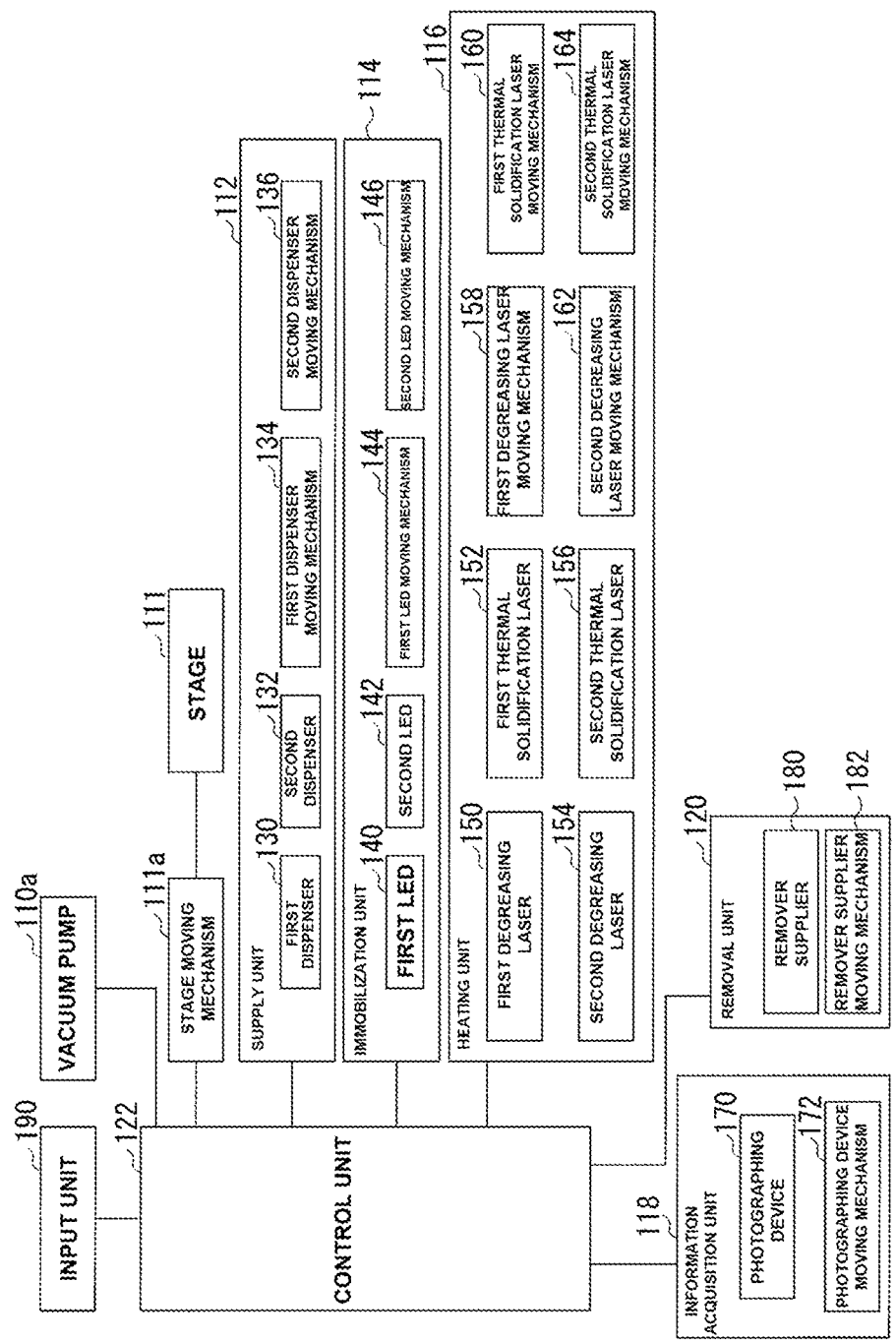
FIG. 7 is a block diagram showing an example of a system configuration of the forming apparatus of the second embodiment.

FIG. 6 is a diagram showing a forming apparatus 101 according to the second embodiment. FIG. 7 is a block diagram showing an example of a system configuration of the forming apparatus 101 of the second embodiment.

As shown in FIG. 6, the forming apparatus 101 according to the second embodiment includes a chamber 110, a stage 111, a supply unit 112, an immobilization unit 114, a heating unit 116, an information acquisition unit 118, a removal unit 120, and a control unit 122 (see FIG. 7).

While the supply unit 12 in the first embodiment has the first dispenser 30 for discharging the first composition (P1) containing the inorganic particle (Pa) and the binder (Pb) and the second dispenser 32 for discharging the second composition (P2) containing the photocurable composition, the supply unit 112 includes a first dispenser 130 for discharging a first composition (P1') containing a first inorganic particle (Pa1') and a first binder (Pb1'), and a second dispenser 132 for discharging a second composition (P2') containing a second inorganic particle (Pa2') and a second binder (Pb2'). The first dispenser 130 discharges the first composition (P1') toward the stage 111 intermittently or continuously. The second dispenser 132 discharges the second composition (P2') toward the stage 111 intermittently or continuously. The first dispenser 130 and the second dispenser 132 are movable by a first dispenser moving mechanism 134 and a second dispenser moving mechanism 136, respectively. The first composition (P1') and the second composition (P2') fill the first dispenser 130 and the second dispenser 132, respectively, with the inorganic particles (Pa1', Pa2') dispersed in the binders (Pb1', Pb2'), respectively.

The first composition (P1') is, for example, a fluid containing the first inorganic particle (Pa1') and the first binder (Pb1') forming the formed body, as in the first composition (P1) in the first embodiment. The first inorganic particle (Pa1') is, for example, a particle consisting of any inorganic material such as metal, oxide, nitride, oxynitride, carbide, hydroxide, carbonate, or phosphate or a combination thereof, as in the inorganic particle (Pa) in the first embodiment.

The second composition (P2') is, for example, a fluid containing the second inorganic particle (Pa2') different from the first inorganic particle (Pa1') and the second binder (Pb2'). The second inorganic particle (Pa2') or a material obtained by heating the second inorganic particle (Pa2') can have high solubility in solvents such as water or high reactivity with reagents such as acids. That is, the second composition (P2') is a composition removable by adding a remover such as water or acids after the thermal solidification. Further, a temperature at which the second inorganic particle (Pa2') is decomposed is higher than a temperature for performing the thermal solidification of the first inorganic particle (Pa1'), for example.

The first binder (Pb1') contains, for example, a photocurable composition which is cured by receiving light (for example, ultraviolet light) having a specific wavelength as in the binder (Pb) in the first embodiment. Likewise, the second binder (Pb2') also contains a photocurable composition. The photocurable composition of the first binder (Pb1') and the photocurable composition of the second binder (Pb2') can be the same as and different from each other.

While the second LED 42 of the immobilization unit 14 in the first embodiment immobilizes the support material (Ps) of the second composition (P2), a second LED 142 of the immobilization unit 114 immobilizes the second composition (P2') on the stage 111 by curing the second binder (Pb2') of the second composition (P2').

While the heating unit 16 in the first embodiment includes the single degreasing laser 50 and the single thermal solidification laser 52, the heating unit 116 includes a first degreasing laser 150 and a first thermal solidification laser 152 for the first composition (P1'), and a second degreasing laser 154 and a second thermal solidification laser 156 for the second composition (P2'). Both the first degreasing laser 150 and the first thermal solidification laser 152 irradiate laser to the first composition (P1') to heat the first composition (P1'), thereby degreasing and thermally solidifying the first composition (P1'), respectively. Both the second degreasing laser 154 and the second thermal solidification laser 156 irradiate laser to the second composition (P2') to heat the second composition (P2'), thereby degreasing and thermally solidifying the second composition (P2'), respectively. The first degreasing laser 150, the first thermal solidification laser 152, the second degreasing laser 154, and the second thermal solidification laser 156 are movable by a first degreasing laser moving mechanism 158, a first thermal solidification laser moving mechanism 160, a second degreasing laser moving mechanism 162, and a second thermal solidification laser moving mechanism 164, respectively.

While the removal unit 20 in the first embodiment has the heating device 80 and the removal laser 82, the removal unit 120 has a remover supplier 180 for supplying a remover (for example, water or acids) for removing (for example, for dissolving or decomposing) the second composition (P2'). The remover supplier 180 can inject the remover toward a predetermined position in order to remove the second composition (P2'), for example, if the second composition (P2') as the support material during the forming operation or after the forming operation has become unnecessary. The remover supplier 180 is appropriately movable by a remover supplier moving mechanism 182. Here, the first composition (P1') is not substantially dissolved by the remover supplied by the remover supplier 180, and is not substantially decomposed by the remover. Here, the terms 'is not substantially dissolved' and 'is not substantially decomposed' mean that 90 wt % or more remains without dissolution or decomposition when soaked in the remover for 1 minute.

Further, a configuration of the remover supplier 180 is not limited to the above example. For example, the remover supplier 180 can supply a reactive gas for decomposing the second composition (P2'). Further, the remover supplier 180 can be a bath tub containing water or acids and installed inside or outside the chamber 110. In this case, by soaking the obtained formed body (including the support material) in the bath tub after the forming operation has been completed without removing the second composition (P2') functioning as the support material, the second composition (P2') as the support material can be removed.

As in the first embodiment, the control unit 122 (see FIG. 7) can perform a feedback control of the supply unit 112, the immobilization unit 114, the heating unit 116, the information acquisition unit 118, and the removal unit 120, based on the information of the first composition (P1') and the second composition (P2') acquired by the information acquisition unit 118. Further, the control unit 122 can direct the remover supplier moving mechanism 182 to move the remover supplier 180 to appropriate arrangement, and direct the remover supplier 180 to supply the remover (for example, water or acids) to the second composition (P2') on the stage 111, as necessary.

[Method of Producing the Formed Body]

Figure 8:
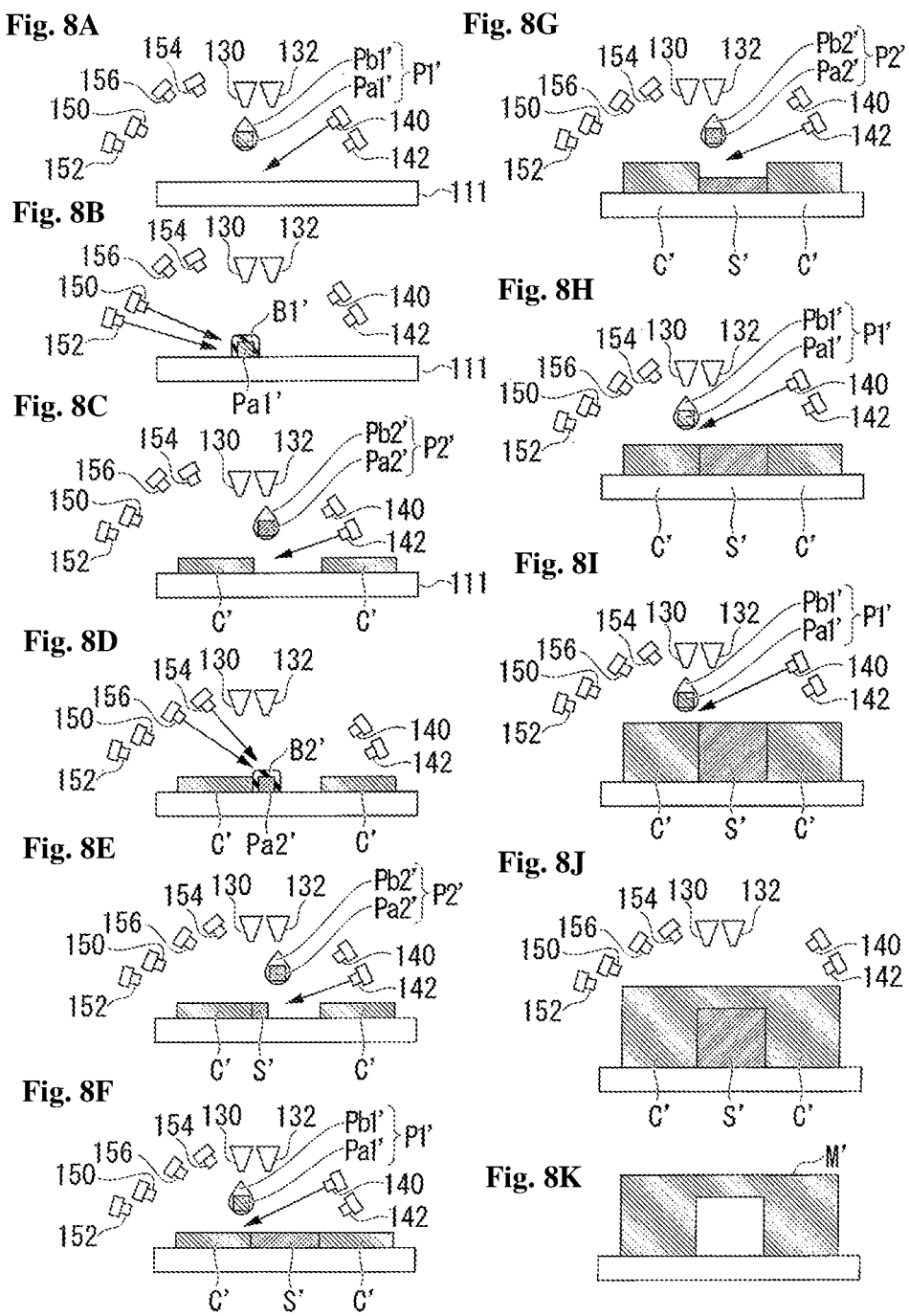
FIGS. 8A to 8K depict steps of a method of producing a formed body by the forming apparatus of the second embodiment.

Next, an example of a method of producing a formed body by the forming apparatus 101 of the second embodiment will be described with reference to FIGS. 8 and 9.

FIGS. 8A to 8K is a diagram showing an example of the method of producing a formed body by the forming apparatus 101 of the second embodiment, and shows a series of processes (a) to (k) of the method of producing a formed body by the forming apparatus 101.

The processes in FIGS. 8A to 8C are substantially the same as in FIGS. 4A to 4C. That is, in FIG. 8A, the first composition (P1') is discharged from the first dispenser 130 toward the stage 111, and the light irradiation to the first composition (P1') is performed by a first LED 140. In FIG. 8B, the first binder (Pb1') of the first composition (P1') is photo-cured to become a first binder (B1'), and with respect to the immobilized first composition (P1'), the first binder (B1') is degreased by the first degreasing laser 150 and the first inorganic particle (Pa1') is thermally solidified by the first thermal solidification laser 152. In FIG. 8C, by repeating this series of processes, a thermally solidified body (C') is formed on a portion, made of the inorganic material of the first composition (P1'), in a first layer of the formed body.

Further, in FIG. 8C, the second composition (P2') is discharged from the second dispenser 132 toward the stage 111, and light is irradiated by the second LED 142.

In FIG. 8D, the second binder (Pb2') of the second composition (P2') is cured by the light irradiation to become a second binder (B2'). With respect to the immobilized second composition (P2'), the second binder (B2') is degreased by the second degreasing laser 154 and the second inorganic particle (Pa2') is thermally solidified by the second thermal solidification laser 156.

In FIG. 8E, a support structure (S') having the second composition (P2') thermally solidified is formed. Thereafter, as in the first composition (P1'), a series of processes of the discharge, immobilization, degreasing, and thermal solidification with respect to the second composition (P2') are repeated.

In FIG. 8F, by the repetition of the process, the support structure (S') is formed on a portion, which becomes a space having no material, in the first layer of the formed body. Next, in order to form a second layer, the first composition (P1') is discharged, immobilized, degreased, and thermally solidified again.

In FIG. 8G, the first composition (P1') is supplied to a portion, made of the inorganic material of the first composition (P1'), in the second layer of the formed body and immobilized, degreased, and thermally solidified. Here, in the first embodiment, as shown in FIG. 4F, while the first composition (P1) is not degreased nor thermally solidified near the support structure (S) in order to suppress the support structure (S) from being decomposed, in the second embodiment, a temperature at which the support structure (S') of the second composition (P2') is decomposed is higher than a temperature at which the first composition (P1') is degreased and thermally solidified, such that all the first compositions (P1') supplied on the stage 111 can be degreased and thermally solidified, regardless of whether the position to which the first composition (P1') is supplied is near the support structure (S'). Next, as in FIG. 8C, the second composition (P2') is supplied from the second dispenser 132 to a portion, which becomes a space having no material, in the second layer of the formed body, and the light irradiation to the second composition (P2') is performed by the second LED 42.

In FIG. 8H, the support structure (S') is formed on the portion, which becomes the space having no material, in the second layer of the formed body. Continuously, in FIG. 8I, as in the second layer, a third layer made of the first composition (P1') and the second composition (P2') is formed. In FIG. 8J, a fourth layer made of the inorganic material of the first composition (P1') is entirely formed.

Finally, in order to remove the support structure (S'), the heating treatment is performed by the remover supplier 180 of the removal unit 120. As a result, a formed body (M') of the inorganic material having a space shown in FIG. 8K is obtained.

Figure 9:
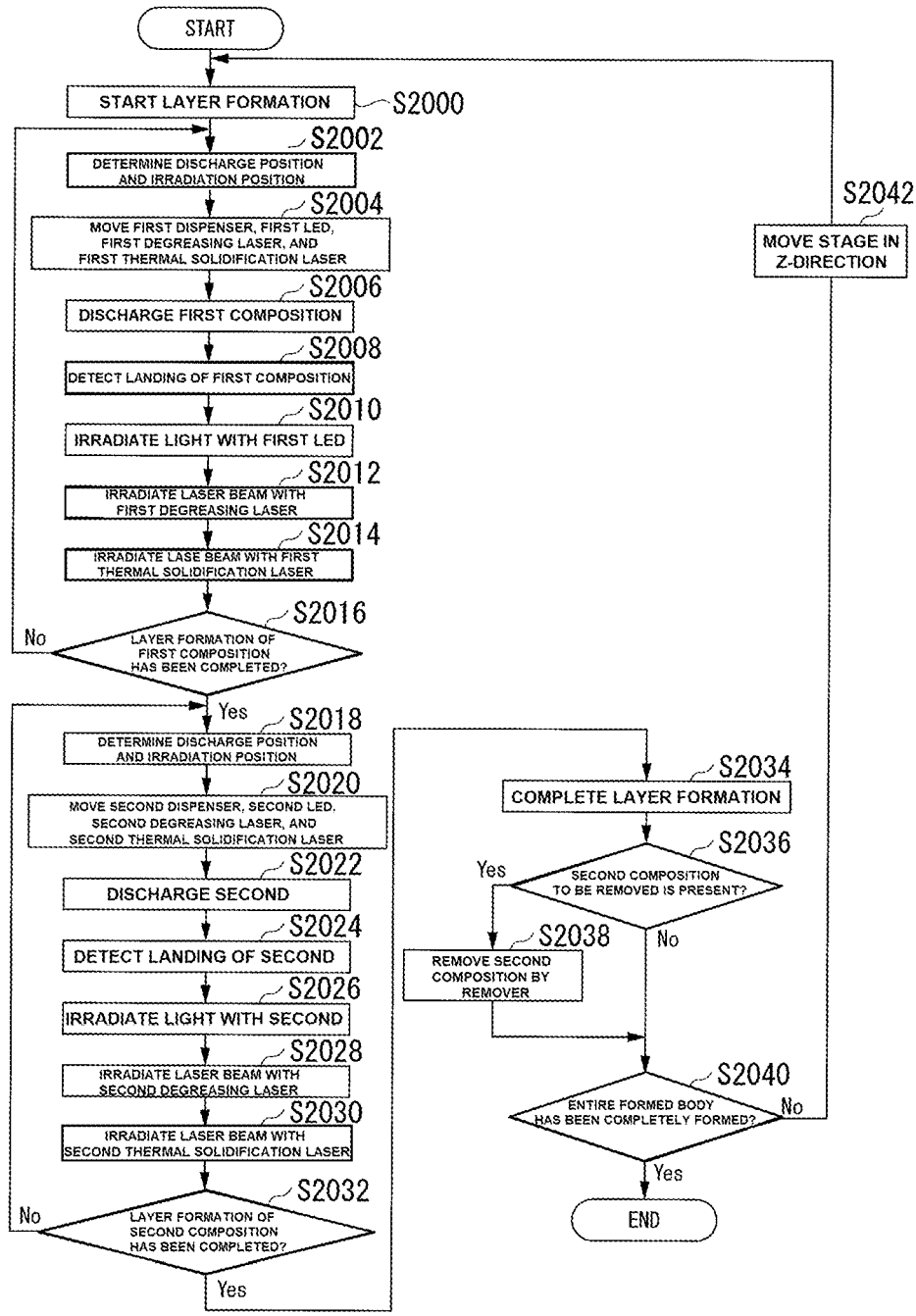
FIG. 9 is a flowchart showing an example of the method of producing a formed body by the forming apparatus of the second embodiment.

FIG. 9 is a flowchart showing an example of the method of producing a formed body by the forming apparatus 101 of the second embodiment.

The flow of the method of producing a formed body according to the second embodiment is basically the same as that in the first embodiment except for using the inorganic material chemically removable by the remover, as the support material.

Processes from the start of the layer formation (S2000) to the irradiation of the first LED 140 (S2010) are the same as those in the first embodiment. S2000, S2002, S2004, S2006, S2008 and S2010 in FIG. 9 correspond to the S1000, S1002, S1004, S1006, S1008 and S1010 in FIG. 5, respectively.

In the first embodiment, after the irradiation of the first LED 40, the control unit 22 determines whether to degrease and thermally solidify the first composition (P1) (S1012). In comparison, in the second embodiment, as described above, the first composition (P1') can be degreased and thermally solidified even near the support structure (S'), such that the determining (S1012) in the first embodiment can be omitted. For this reason, in the second embodiment, the heating unit 116 (here, the first degreasing laser 150 and the first thermal solidification laser 152) is also moved while the first dispenser 130 and the first LED 140 are moved, according to the irradiation position determined in the S2002 (S2004). However, the moving timings of the first degreasing laser 150 and the first thermal solidification laser 152 are not limited to the above example, and can be performed, for example, after the irradiation of the first LED 140.

After the irradiation of the first LED 140, degreasing (S2012) and thermally solidifying (S2014) are performed. Thereafter, the control unit 122 determines (S2016) whether a portion, made of the first composition (P1'), in the first layer has been completely formed, based on the input data or the information of the first composition (P1') on the stage 111 acquired by the information acquisition unit 118. The forming cycle of the first composition (P1') (S2002, S2004, S2006, S2008, S2010, S2012, S2014 and S2016) is repeated until it is determined that the portion, made of the first composition (P1'), in the first layer has been completely formed.

If it is determined that the portion, made of the first composition (P1'), in the first layer has been completely formed, the forming of the second composition (P2') is started. Since the second composition (P2') contains the second inorganic particle (Pa2') which can be thermally solidified, unlike the first embodiment, degreasing (S2028) and thermally solidifying (S2030) are performed even with respect to the second composition (P2'). Except for this point, the other processes are the same as those in the first embodiment.

If it is determined that the portion, made of the second composition (P2'), in the first layer has been completely formed (S2032: YES), the control unit 122 determines that the first layer has been completely formed (S2034).

Next, as in the first embodiment, the control unit 122 determines whether the second composition (P2') to be removed from the stage 111 is present at the moment (S2036). If it is determined that the second composition (P2') to be removed is present (S2036:YES), the control unit 122 directs the remover supplier 180 to supply the remover toward the second composition (P2') (S2038).

If the removing has been completed, or if it is determined that the second composition (P2') to be removed from the stage 111 has not been present at the moment (S2036:NO), the control unit 122 determines, in view of the input data, whether the entire formed body has been completely formed (S2040). The subsequent flow is the same as that in the first embodiment.

Further, if the unnecessary support structure (S') (second composition (P2')) is removed by soaking the second composition (P2') in a bath tub containing the remover, the removing (S2036, S2038) can be omitted. For example, the formed body can be once formed in a state of including the support structure (S'), and then can be taken out of the chamber 110 and soaked in the bath tub, and can also be soaked in the bath tub with being put into the chamber 110.

[Effects]

In accordance with the forming apparatus 101 according to the second embodiment, it is possible to perform the degreasing and the thermal solidification even near the support structure (S'), thereby enjoying more the advantages described for the forming apparatus 1 according to the first embodiment than in the first embodiment. That is, in the first embodiment, since the first composition (P1) near the support structure (S) can be collectively degreased and thermally solidified later, the degreasing process and the thermal solidification process cannot be subdivided sufficiently near the support structure (S), but in the second embodiment, both the degreasing process and the thermal solidification process of the first composition (P1') can be subdivided. As a result, as compared to the first embodiment, it is possible to further suppress the shrinkage of the formed body due to the gap caused by the degreasing of the binder, and to further suppress cracks or breakage of the thermally solidified body from occurring.

Further, in the above example, although one LED, one degreasing laser, and one thermal solidification laser (that is, two LEDs, two degreasing lasers, and two thermal solidification lasers are installed as a whole) are installed with respect to each of the first composition (P1') and the second composition (P2'), some of these can be omitted. That is, both the first composition (P1') and the second composition (P2') can be all immobilized by using a single LED, and likewise, both the first composition (P1') and the second composition (P2') can be all degreased and thermally solidified by a single degreasing laser or a single thermal solidification laser.

Third Embodiment

Next, a third embodiment will be described with reference with FIGS. 10 to 13. The third embodiment differs from the first embodiment in that the support material is an organic material having high heat resistance. Further, configurations except for configurations described below are the same as those in the first embodiment.

[Configuration]

Figure 10:
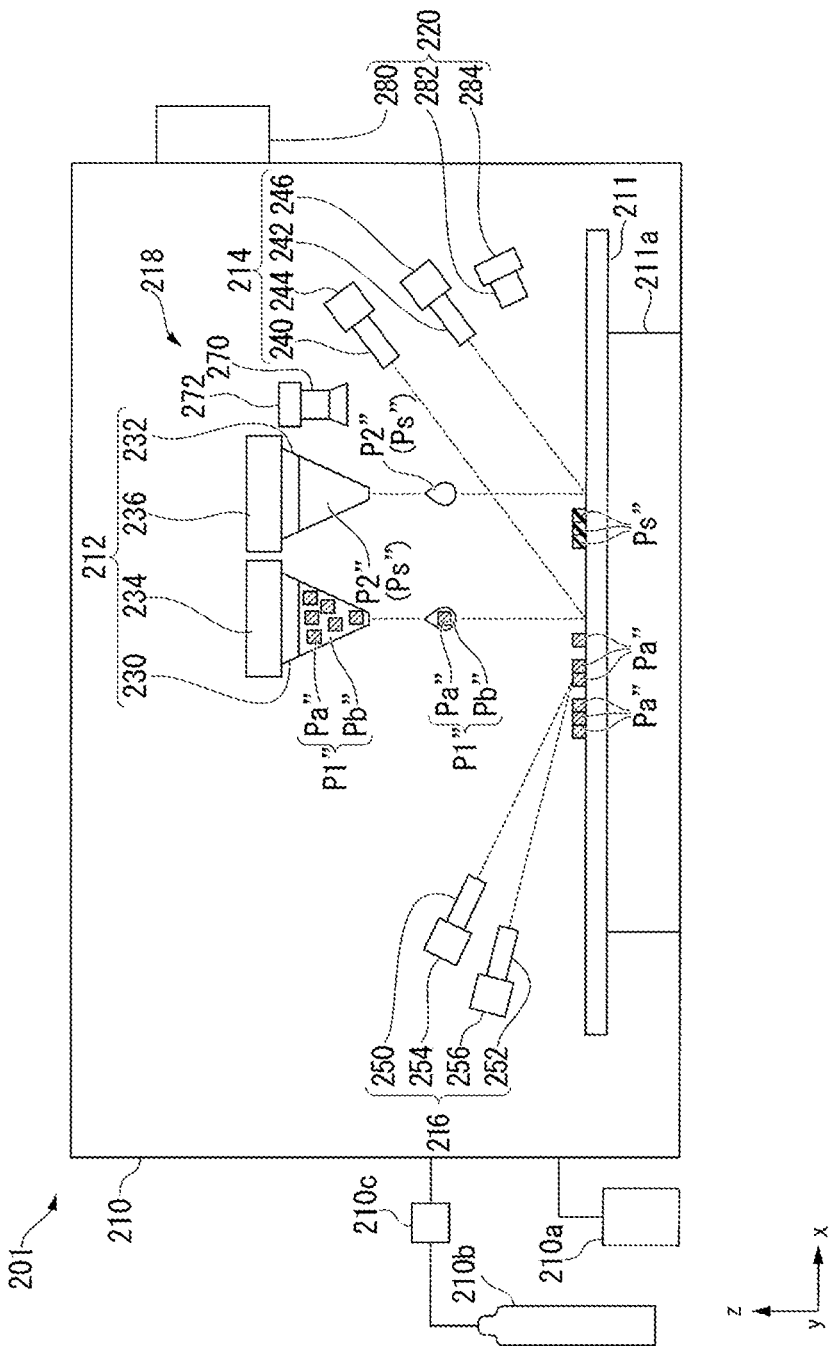
FIG. 10 is a schematic front diagram showing a forming apparatus according to a third embodiment.
Figure 11:
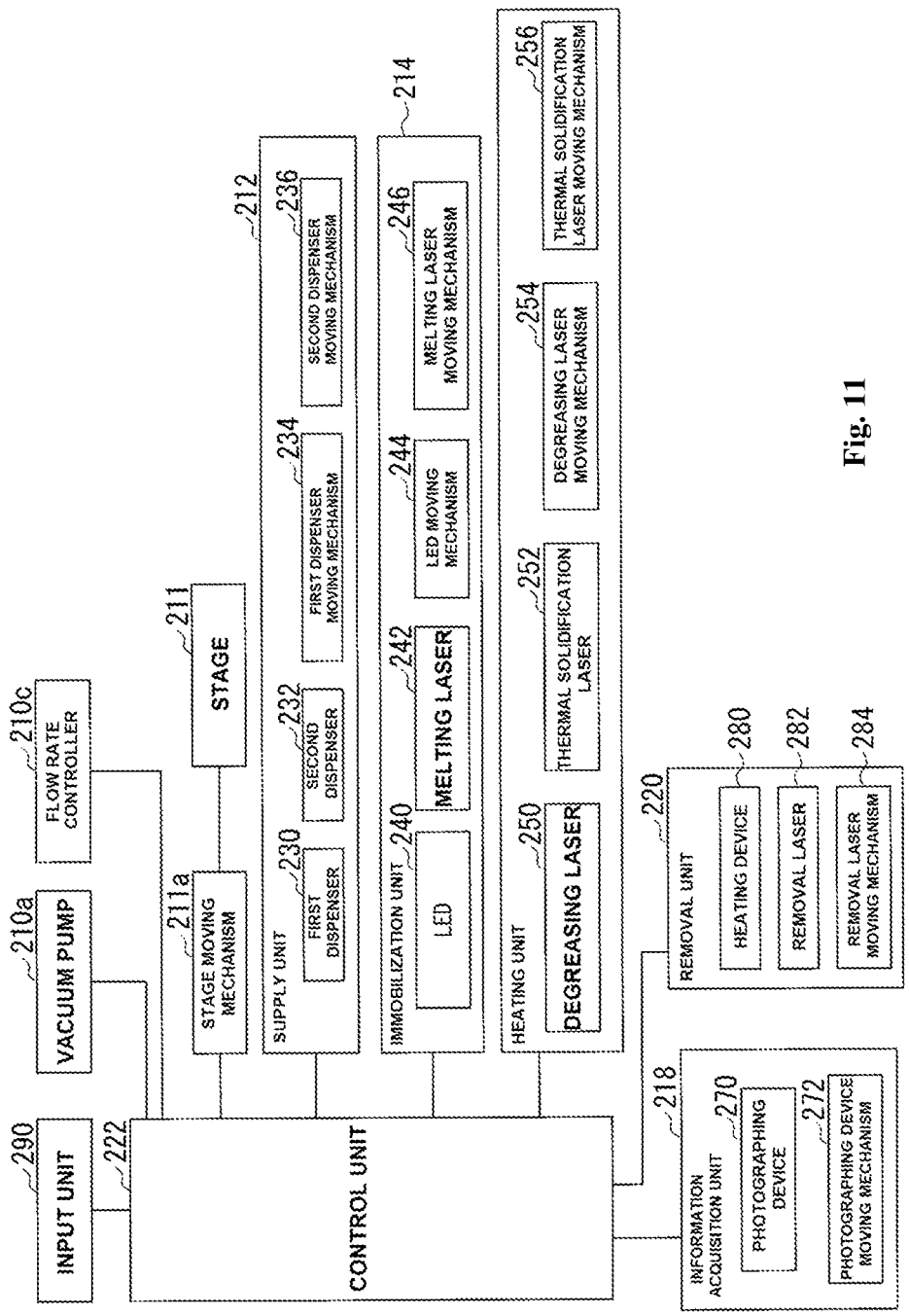
FIG. 11 is a block diagram showing an example of a system configuration of the forming apparatus of the third embodiment.
Figure 12:
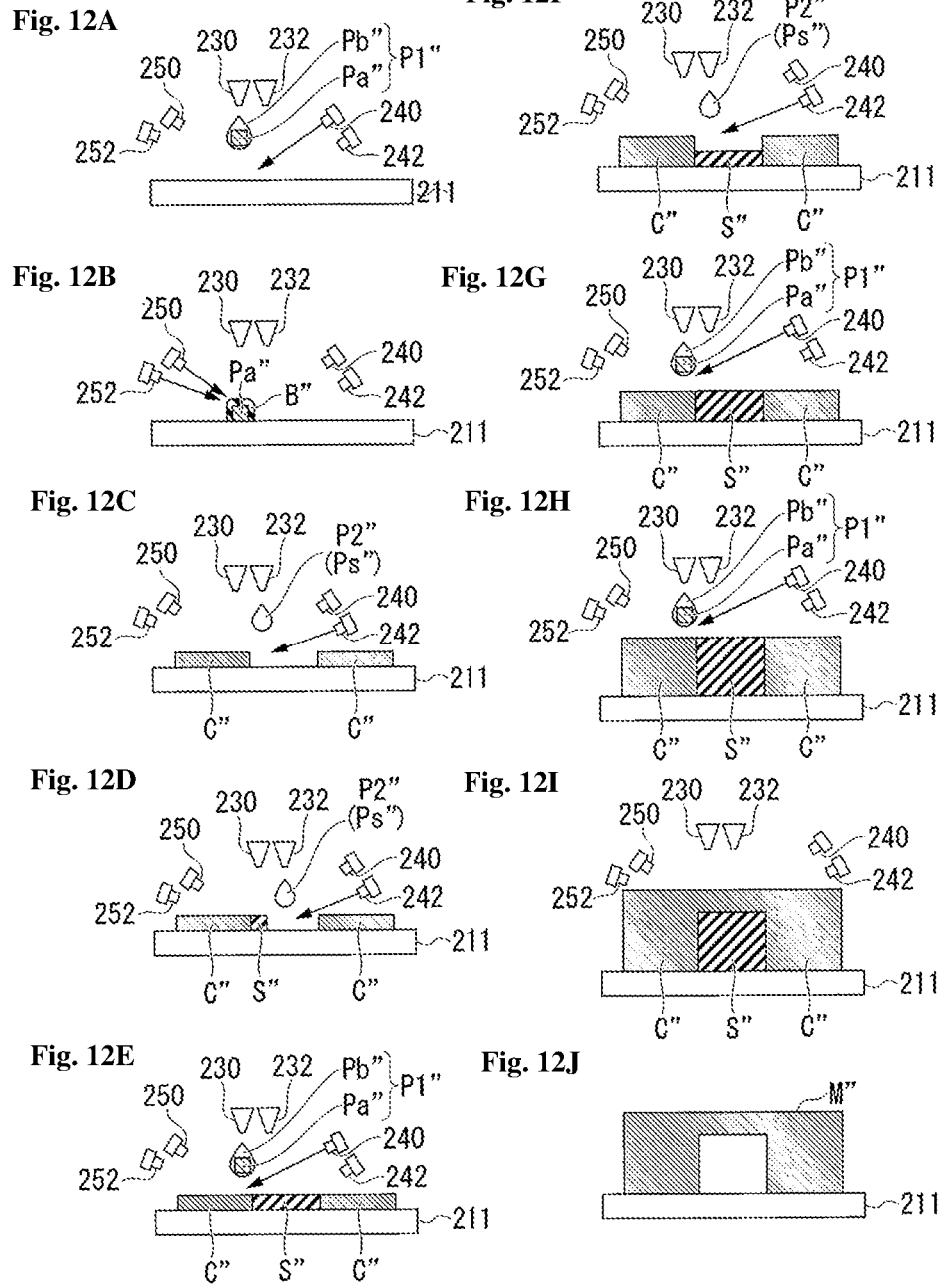
FIGS. 12A to 12J depict steps of a method of producing a formed body by the forming apparatus of the third embodiment.

FIG. 10 is a diagram showing a forming apparatus 201 according to the third embodiment. FIG. 11 is a block diagram showing an example of a system configuration of the forming apparatus 201 of the third embodiment.

As shown in FIG. 10, the forming apparatus 201 according to the third embodiment includes a chamber 210, a stage 211, a supply unit 212, an immobilization unit 214, a heating unit 216, an information acquisition unit 218, a removal unit 220, and a control unit 222 (see FIG. 11).

While the support material (Ps) in the first embodiment is a material which is decomposed at the degreasing temperature and the thermal solidification temperature of the first composition (P1), a second composition (P2") in the third embodiment contains a support material (Ps") which is not decomposed at the degreasing temperature and the thermal solidification temperature of the first composition (P1") under the anaerobic atmosphere. For example, the support material (Ps") is decomposed at the degreasing temperature and the thermal solidification temperature of the first composition (P1") in the presence of oxygen. In the present specification, the term 'under the anaerobic atmosphere' means a state where oxygen in the atmosphere does not substantially affect the operation effects of the disclosure, and for example, includes a state where oxygen of the degree which can support the thermally solidified body of the first composition (P1") is present. For example, the oxygen concentration under the anaerobic atmosphere is 0 volume % to 0.1 volume %, preferably, 0 volume % to 0.05 volume %, more preferably, 0 volume % to 0.01 volume %. Further, the term 'in the presence of oxygen' means a state where the amount of oxygen capable of generating combustion of a general organic matter at high temperature of about 300° C. to about 500° C. is present.

The support material (Ps") is, for example, an engineering plastic having high heat resistance, such as omnidirectional polyamide-based resin (aramid resin). For example, the support material (Ps") is poly-m-phenyleneisophthalamide.

As in the first embodiment, the internal pressure of the chamber 210 can be changed by a vacuum pump 210a connected to the chamber 210. Further, the atmosphere inside the chamber 210 can be substituted with a gas (for example, an inert gas such as nitrogen or argon) accommodated in a gas bombe 210b. The flow rate of the gas or the like from the gas bombe 210b can be controlled by a flow rate control unit 210c. Further, multiple kinds of gases can be supplied to the chamber 210 as necessary.

Typically, since the support material (Ps") satisfying the above condition has a thermoplastic property, in the third embodiment, the immobilization unit 214 has a melting laser 242 instead of the second LED 42 in the first embodiment. The melting laser 242 is movable appropriately by a melting laser moving mechanism 246. The melting laser 242 can heat and melt the support material (Ps") by irradiating laser beam to the support material (Ps") which is a thermoplastic composition. Thereafter, the support material (Ps") is naturally cooled on the stage 211, such that the second composition (P2") is immobilized on the stage 211. However, a configuration of the immobilization unit 214 is not limited to the above example, and can be changed appropriately according to the nature of the support material (Ps").

[Method of Producing the Formed Body]

Next, an example of a method of producing a formed body by the forming apparatus 201 of the third embodiment will be described with reference to FIGS. 12A to 12J and FIG. 13.

FIGS. 12A to 12J is a diagram showing an example of a method of producing a formed body by the forming apparatus 201 of the third embodiment, and shows a series of processes (a) to (j) of the method of producing a formed body by the forming apparatus 201.

The processes in FIGS. 12A to 12I are performed under the anaerobic atmosphere. For this reason, before FIG. 12A, the interior of the chamber 210 becomes the anaerobic atmosphere by vacuumization or gas substitution.

The processes in FIGS. 12A to 12E are substantially the same as those in FIGS. 4A to 4E except for using the melting laser 242, rather than the LED, for immobilizing the second composition (P2"). That is, the first composition (P1") is discharged from a first dispenser 230 and immobilized by a LED 240 (FIG. 12A), and degreased and thermally solidified by a degreasing laser 250 and a thermal solidification laser 252 (FIG. 12B). After a thermally solidified body (C") has been formed on a portion, made of an inorganic material of the first composition (P1"), in a first layer of the formed body, the second composition (P2") is melted by the melting laser 242 (FIG. 12C). The second composition (P2") is once melted by the melting laser 242, and then solidified by natural cooling, and immobilized on the stage 211 to form a support structure (S"). The second composition (P2") is repeatedly discharged and immobilized (FIG. 12D) to form the first layer composed of the thermally solidified body (C") and the support structure (S"). Next, the formation of a second layer is started, and the first composition (P1") constituting the second layer is discharged and immobilized (FIG. 12E).

In FIG. 12F, the first composition (P1") is supplied to a portion, made of the inorganic material of the first composition (P1"), in the second layer of the formed body and immobilized, degreased, and thermally solidified. Here, in the first embodiment, as shown in FIG. 4F, while the first composition (P1) is not degreased nor thermally solidified near the support structure (S) in order to suppress the decomposition of the support structure (S), in the third embodiment, a temperature at which the support structure (S") of the second composition (P2") is decomposed under the anaerobic atmosphere is higher than a thermal solidification temperature of the first composition (P1"), such that as in the second embodiment, all the first compositions (P1") supplied on the stage 211 can be degreased and thermally solidified, regardless of whether the position to which the first composition (P1") is supplied is near the support structure (S"). Further, if the first composition (P1") is heated for the degreasing or the thermal solidification, the support structure (S") near the first composition (P1") can be once melted, but as described above, since the support structure (S") is not decomposed under the anaerobic atmosphere, the support structure (S") is solidified again by natural cooling. Next, as in FIG. 12C, the second composition (P2") is supplied from a second dispenser 232 to a portion, which becomes a space having no material, in the second layer of the formed body, and the second composition (P2") is melted by the melting laser 242.

In FIG. 12G, the support structure (S") is formed on the portion, which becomes the space having no material, in the second layer of the formed body. Continuously, in FIG. 12H, as in the second layer, a third layer made of the first composition (P1") and the second composition (P2") is formed. In FIG. 12I, a fourth layer made of the inorganic material of the first composition (P1") is entirely formed.

Finally, in order to remove the support structure (S"), after oxygen has been introduced into the chamber 210 by the introduction of the atmosphere, oxygen gas, or the like, the heating treatment is performed by a heating device 280 or a removal laser 282 of the removal unit 220. Since the support structure (S") has high heat resistance under the anaerobic atmosphere, but has lower heat resistance, in the presence of oxygen, than that under the anaerobic atmosphere, the support structure (S") can be removed by the heating treatment in the presence of oxygen. As a result, a formed body (M") of the inorganic material having the space shown in FIG. 12J is obtained.

Figure 13:
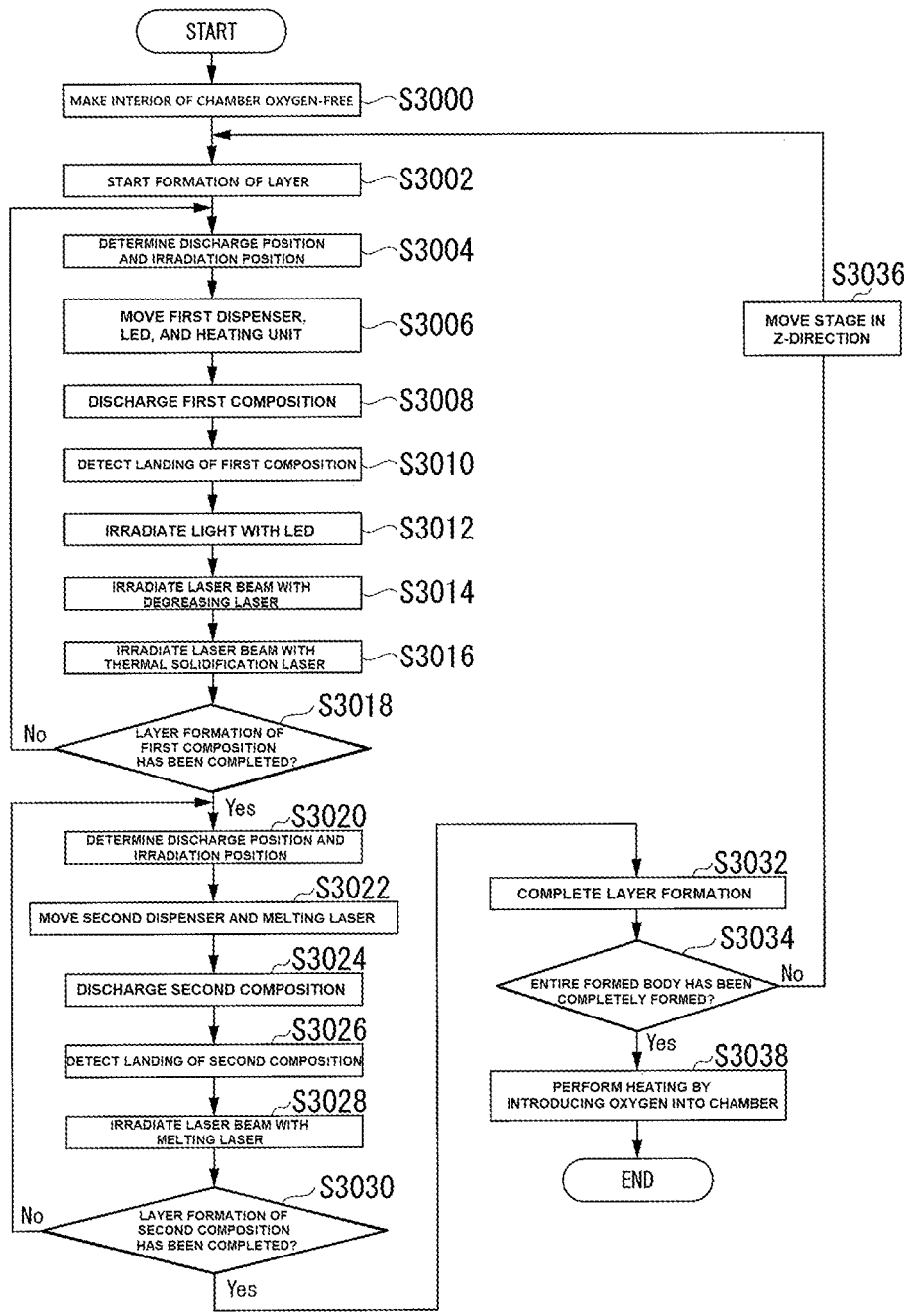
FIG. 13 is a flowchart showing an example of the method of producing a formed body by the forming apparatus of the third embodiment.

FIG. 13 is a flowchart showing an example of the method of producing a formed body by the forming apparatus 201 of the third embodiment.

In comparison with the method of producing a formed body by the forming apparatus 1 shown in FIG. 5, the method is different in that the support structure (S") is removed by changing the atmosphere inside the chamber 210, and the melting laser 242 rather than the LED is used for immobilizing the second composition (P2").

In the third embodiment, the interior of the chamber 210 is made oxygen-free first (S3000). For example, the control unit 222 directs the vacuum pump 210a or the flow rate control unit 210c to substitute the interior of the chamber 210 with an inert gas.

Next, the formation of the first layer is started (S3002). The layer formation of the first composition (P1") is performed as in the first embodiment. S3004, S3006, S3008, S3010, S3012, S3014, S3016, and S3018 in FIG. 13 correspond to the S1002, S1004, S1006, S1008, S1010, S1012, S1014, S1016, S1018, and S1020 in FIG. 5, respectively.

If it is determined that the layer formation of the first composition (P1") has been completed (S3018:YES), the flow proceeds to the layer formation of the second composition (P2") (S3020, S3022, S3024, S3026, S3028, and S3030). The S3020, S3022, S3024, S3026, S3028, and S3030 in FIG. 13 correspond to the S1022, S1024, S1026, S1028, S1030, and S1032 in FIG. 5, respectively, except for using the melting laser 242, rather than the LED 42, for immobilizing the second composition (P2").

If it is determined that the layer formation of the second composition (P2") has been completed (S3030:YES), the control unit 222 determines that the formation of the first layer has been completed (S3032).

Next, the control unit 222 determines whether the formation of the entire formed body has been completed (S3034). If it is determined that the formation of the entire formed body has not been completed (S3034:NO), the control unit 222 directs a stage moving mechanism 211a to move the stage 211 in the z-direction (S3036). Thereafter, the flow returns to the S3002, and the formation of the second layer is started.

Meanwhile, if it is determined that the formation of the entire formed body has been completed (S3034:YES), the control unit 222 directs the vacuum pump 210a or the flow rate control unit 210c to introduce, for example, the atmosphere into the chamber 210, and directs the heating device 280 or the removal laser 282 to heat the support structure (S") to be removed (S3038). As a result, the support structure (S") is removed, such that the formed body having a desired shape is obtained.

[Effects]

In accordance with the forming apparatus 201 according to the third embodiment, it is possible to perform the degreasing and thermal solidification even near the support structure (S") as in the second embodiment, thereby further suppressing the shrinkage of the formed body due to the gap caused by degreasing the binder, and further suppressing cracks or breakage of the thermally solidified body from occurring, as compared with the first embodiment. Further, in the third embodiment, unlike the second embodiment, since it is not necessary to degrease and thermally solidify the second composition (P2"), it is possible to simplify the configuration and the forming operation of the forming apparatus 201, as compared with the second embodiment. As a result, it is possible to execute the three-dimensional shaping having improved degree of freedom at lower costs and higher speed.

[Modifications]

In the above example, after the discharge, immobilization, degreasing, and thermal solidification of the composition have been completed, the stage moves in the x-direction or the y-direction to discharge the next composition, but the forming process is not limited thereto. For example, after the immobilization of the composition, the stage can be moved before the degreasing, and the discharge or immobilization of the next composition can be performed together as the degreasing or the thermal solidification. Further, the discharge of the next composition can be performed at the same time as the immobilization of the composition. For example, if the discharge of the composition from the dispenser is performed continuously rather than intermittently, the composition is supplied continuously, such that the immobilization, degreasing, and thermal solidification of the supplied composition, and the movement of each component such as the stage or the laser can be performed at the same time as the supply of the composition.

In the above example, after the composition lands on the stage, light irradiation for immobilization by the LED or the melting laser is performed, but the timing of the immobilization process is not limited thereto. For example, light irradiation can be performed while the composition is discharged and falls.

In the above example, the degreasing laser and the thermal solidification laser irradiate laser beam to substantially the same region, but the irradiation positions thereof cannot be necessarily the same. For example, the irradiation position of the thermal solidification laser can be spaced at a certain distance (for example, about 1 mm) apart from the irradiation position of the degreasing laser, and the irradiation of the thermal solidification laser can be controlled to follow the irradiation of the degreasing laser.

In the above example, the operation of the forming apparatus can be stabilized by temporarily immobilizing the composition on the stage by using the LED or the melting laser before the degreasing, but for example, this immobilization can be omitted, and if the landing of the composition on the stage is detected, the degreasing of the binder can be performed by irradiating laser beam with the degreasing laser.

In the above example, the immobilization unit and the heating unit are installed as separate components, but for example, as a light source for curing the photocurable composition of the composition, the degreasing laser, or the thermal solidification laser of the heating unit can also be used. In this case, when the immobilization is performed, a decreased output of the laser can be used, and when the degreasing and the thermal solidification are performed, an increased output of the laser can be used. As a result, the configuration of the forming apparatus can be simplified.

In the above example, after the thermally solidifying is executed and before the landing of the composition is detected, the discharge position of the dispenser and the irradiation positions of the immobilization unit and the heating unit can be determined and the arrangement thereof can be changed, by the control unit, but the timings of determination of these discharge and irradiation positions and the change in arrangement thereof are not limited thereto. The control unit can determine the discharge position of the dispenser and the irradiation positions of the immobilization unit and the heating unit at any timing, and can direct the dispenser moving mechanism, the LED moving mechanism, the degreasing laser moving mechanism, and the thermal solidification laser moving mechanism to change the arrangement thereof at any timing.

In the above example, the discharge position and the irradiation position are determined based on the information acquired by the information acquisition unit, but the discharge of the composition and each step can be executed according to a sequence of predetermined discharge position and irradiation position without using such information. Likewise, in the above example, the irradiation timing of the immobilization unit or the heating unit is determined based on the information acquired by the information acquisition unit, but the irradiation timing of the immobilization unit or the heating unit can also be determined based on the timing at which the dispenser actually discharges the composition, the density of the composition, the amount of composition discharged, the distance between the dispenser and the stage, or the like without using such information.

In the above example, the control unit determines the next discharge position and irradiation position for every forming cycle, but the control unit can determine the presence or absence of the discharge of the first dispenser and the second dispenser, the presence or absence of the degreasing or the thermal solidification, and the like at each position while continuously moving, for example, the first dispenser and the second dispenser at a constant speed in a predetermined direction. In this case, in the step where a discharge operation has been completed to some extent, it is possible to additionally perform the discharge or the thermal solidification, based on the information acquired by the information acquisition unit, at the position at which it is determined that the first composition and the second composition have been discharged by that time, but the degreasing or the thermal solidification has not been appropriately performed.

In the above example, although the process of forming the layers of the formed body one by one from below by descending the stage step by step in the z-direction has been described, the forming process is not necessarily performed in a layer basis. For example, the formed body can be formed by appropriately changing the heights or directions of the dispenser, the immobilization unit, and the heating unit to deposit the composition on the stage without moving the stage in the z-direction. In this case, the dispenser, the immobilization unit, and the heating unit is movable in the z-direction by the dispenser moving mechanism, the LED moving mechanism, the degreasing laser moving mechanism, and the thermal solidification laser moving mechanism.

Further, in the above example, the dispenser, the immobilization unit, and the heating unit are moved based on the determined discharge position and irradiation position, but the stage can be moved in the x-direction and the y-direction instead of moving the dispenser, the immobilization unit, and the heating unit. That is, the positions of the dispenser, the immobilization unit, and the heating unit can be fixed, and the stage can be moved in the x-direction, the y-direction, and the z-direction. Alternatively, the stage, the dispenser, the immobilization unit, and the heating unit can be all movable in the x-direction and the y-direction.

In the above example, one kind of inorganic material (inorganic particle Pa, Pa1', Pa") is used as the material constituting the formed body, but two kinds of inorganic materials can be used. According to the number of different kinds of inorganic materials, the number of supply means such as the dispenser, immobilization means such as the LED, heating means such as the degreasing laser or the thermal solidification laser, or the like can be changed appropriately.

In the above example, the dispenser is used as the supplier for supplying the composition, but the supplier is not limited thereto. For example, if the composition is a solid having a certain size or more, a fine arm mechanism which can dispose the composition at any place on the stage while maintaining the composition with adsorption by physical gripping, magnetic action, or the like can be used as the supplier.

In the above example, although one in which the inorganic particle has been dispersed in the binder has been described as the composition containing the inorganic particle such as the first composition (P1), the configuration of the composition is not limited thereto. For example, one in which the inorganic material has been coated with the organic binder (for example, thermoplastic resin) can also be used. In this case, for example, the immobilization unit can have the melting laser instead of the LED, and can immobilize the composition on the stage by melting the organic coating with the discharged composition with the melting laser and solidifying the composition by natural cooling.

As described above, although the present disclosure has been described with reference to the limited embodiments and drawings, the present disclosure is not limited thereto, and it is natural that various modifications and variations can be made by those skilled in the art to which the present disclosure pertains within the technical idea of the present disclosure and the equivalent scope of the claims.

The invention claimed is:

1. A forming apparatus, comprising:
a chamber;
a stage located within the chamber;
a supply unit having a first supply unit and a second supply unit, wherein the first supply unit is configured to intermittently or continuously supply a first composition to the stage, wherein the first composition comprises an inorganic material, and wherein the second supply unit is configured to intermittently or continuously supply a second composition to the stage, wherein the second composition comprises a support material configured to support the first composition;
an immobilization unit configured to immobilize the second composition on the stage;
a heating unit configured to apply heat to the first composition on the stage;
a removal unit configured perform local removal of the second composition immobilized on the stage by locally decomposing the second composition;
an information acquisition unit configured to monitor shapes of the first composition and the second composition on the stage, the information acquisition unit being configured to acquire input data of the shapes of the first composition and the second composition, and
a control unit configured to control the first supply unit and the heating unit to repeat supply and heating of the first composition, the control unit configured to perform feedback control of the removal unit to perform the local removal of the second composition based on the input data of the shapes of the first composition and the second composition,
wherein the forming apparatus is configured such that at least one of the height and direction of the supply unit is changeable, and the forming apparatus is configured such that heights of the supply unit, the immobilization unit, and the heating unit are movable without moving the height of the stage so that a position having the same height as, or different height from, the current supply position can be selected as the next supply position by the supply unit,
wherein the control unit is configured to move the supply unit to the next supply position based on the input data of the shapes of the first composition and the second composition,
wherein the heating unit comprises a thermal solidification heat source configured to at least thermally solidify the first composition on the stage,
wherein the first composition comprises an organic binder having the inorganic material dispersed therein,
wherein the heating unit comprises a degreasing heat source configured to degrease the organic binder by applying heat to the first composition, and
wherein the control unit controls the degreasing heat source to perform the degreasing before the thermal solidification of the first composition by the thermal solidification heat source, and
wherein the supply unit, the immobilization unit, the heating unit, the removal unit, and the information acquisition unit are located within the chamber.

2. The forming apparatus of claim 1,
wherein the control unit controls the first supply unit and the heating unit to repeat supply and heating of the first composition at least along a surface of the stage.

3. The forming apparatus of claim 1,
wherein the immobilization unit immobilizes the first composition on the stage.

4. The forming apparatus of claim 1, wherein the support material of the second composition is decomposed at a temperature lower than the inorganic material of the first composition when heated, and wherein the removal unit comprises a heating unit configured to decompose the support material.

5. The forming apparatus of claim 1,
wherein the removal unit comprises a remover supplier configured to supply a remover, wherein the remover dissolves or decomposes the support material of the second composition but does not substantially dissolve and decompose the inorganic material of the first composition.

6. The forming apparatus of claim 1,
wherein the inorganic material of the first composition is thermally solidified by the heating unit when heated to a first temperature or more, and
wherein the support material of the second composition is not decomposed at the first temperature under an anaerobic atmosphere.

7. The forming apparatus of any one of claims 1,
wherein the second composition is a photocurable composition, and
wherein the immobilization unit comprises a light source configured to photo-cure the second composition.

* * * * *